(12) United States Patent  
Arai

(10) Patent No.: US 11,265,460 B2  
(45) Date of Patent: Mar. 1, 2022

(54) ELECTRONIC DEVICE, CONTROL DEVICE, AND CONTROL METHOD

(71) Applicant: SHARP KABUSHIKI KAISHA, Sakai (JP)

(72) Inventor: Takeshi Arai, Sakai (JP)

(73) Assignee: SHARP KABUSHIKI KAISHA, Sakai (JP)

( * ) Notice: Subject to any disclaimer, the term of this patent is extended or adjusted under 35 U.S.C. 154(b) by 0 days.

(21) Appl. No.: 16/646,995

(22) PCT Filed: May 24, 2018

(86) PCT No.: PCT/JP2018/019954  
§ 371 (c)(1),  
(2) Date: Mar. 12, 2020

(87) PCT Pub. No.: WO2019/058641  
PCT Pub. Date: Mar. 28, 2019

(65) Prior Publication Data  
US 2020/0221021 A1 Jul. 9, 2020

(30) Foreign Application Priority Data  
Sep. 20, 2017 (JP) .............................. JP2017-180592

(51) Int. Cl.  
*H04N 5/232* (2006.01)  
*G06F 3/01* (2006.01)

(52) U.S. Cl.  
CPC ......... *H04N 5/23219* (2013.01); *G06F 3/012* (2013.01); *G06F 3/013* (2013.01); *H04N 5/232939* (2018.08)

(58) Field of Classification Search  
CPC ......... G03B 15/00; G06F 3/012; G06F 3/013; H04N 5/23219; H04N 5/232939  
USPC ............. 348/78, 14.02, 207.11, 46; 349/122; 382/103; 715/702  
See application file for complete search history.

(56) References Cited

U.S. PATENT DOCUMENTS

| | | | |
|---|---|---|---|
| 9,344,673 B1* | 5/2016 | Buchheit | H04N 5/23218 |
| 2009/0304232 A1* | 12/2009 | Tsukizawa | G06K 9/0061 |
| | | | 382/103 |
| 2014/0267990 A1* | 9/2014 | Moon | G06F 1/1605 |
| | | | 349/122 |
| 2015/0091794 A1* | 4/2015 | Ha | H04M 1/72403 |
| | | | 345/156 |
| 2015/0109507 A1* | 4/2015 | Li | H04N 5/247 |
| | | | 348/333.01 |

(Continued)

FOREIGN PATENT DOCUMENTS

| | | | | |
|---|---|---|---|---|
| JP | 2012187178 A | * | 10/2012 | ............... A61B 3/14 |
| JP | 2015-139037 A | | 7/2015 | |
| JP | 2015-142317 A | | 8/2015 | |

*Primary Examiner* — Thai Q Tran  
*Assistant Examiner* — Stephen R Smith  
(74) *Attorney, Agent, or Firm* — ScienBiziP, P.C.

(57) ABSTRACT

The present invention, in an aspect thereof, enables a human imaging subject to simultaneously and easily recognize his/her face and a line-of-sight guidance image on a display device. In an electronic device, an image capturing device is disposed in a peripheral region of a display screen of a display device. A control device performs a display process of displaying a line-of-sight guidance image on the display screen around an arrangement position of the image capturing device.

13 Claims, 14 Drawing Sheets

(56) References Cited

U.S. PATENT DOCUMENTS

| | | | |
|---|---|---|---|
| 2015/0138321 A1* | 5/2015 | Yamamoto | H04N 5/232939 |
| | | | 348/46 |
| 2016/0323503 A1* | 11/2016 | Wada | H04M 1/72403 |
| 2016/0378295 A1* | 12/2016 | Cousins | G06F 3/04812 |
| | | | 715/702 |
| 2017/0155867 A1* | 6/2017 | Yokota | G02B 27/0101 |
| 2017/0221244 A1* | 8/2017 | Hiraga | G06T 11/60 |
| 2020/0204725 A1* | 6/2020 | Li | H04N 5/232 |

* cited by examiner

ELECTRONIC DEVICE, CONTROL DEVICE, AND CONTROL METHOD

TECHNICAL FIELD

The present invention relates to electronic devices, control devices, and control methods.

BACKGROUND ART

A user of an electronic device such as a smartphone or a tablet computer can take pictures of himself/herself ("selfie photos") by using the electronic device if the electronic device has a built-in camera on the display side of the electronic device.

Patent Literature 1, as an example, discloses an electronic device with a selfie photography function that displays a shutter icon on the display device and that when the user's finger approaches, also displays a line-of-sight guidance arrow. The electronic device takes a selfie photo when the finger touches the shutter icon with the user's line of sight being directed at the display device from the front.

CITATION LIST

Patent Literature

Patent Literature 1: Japanese Unexamined Patent Application Publication, Tokukai, No. 2015-139037 (Publication Date: Jul. 30, 2015)

SUMMARY OF INVENTION

Technical Problem

The electronic device disclosed in Patent Literature 1 displays the line-of-sight guidance arrow in such a manner that the line-of-sight guidance arrow overlaps a part of an image of the user's face. The user therefore has difficulty in simultaneously recognizing his/her face and the line-of-sight guidance arrow to take a selfie photo.

The present invention, in an aspect thereof, has been made in view of this problem and has an object to enable the user to simultaneously and easily recognize his/her face and a line-of-sight guidance on a display device.

Solution to Problem

To address this problem, the present invention, in an aspect thereof, is directed to an electronic device including: at least one image capturing device; at least one display device; and at least one control device, wherein the at least one image capturing device is disposed in a peripheral region of a display screen of the display device, and the control device performs a display process of displaying a line-of-sight guidance image on the display screen around an arrangement position of the at least one image capturing device, to guide a line of sight of a human imaging subject to a reference region of the display screen, the reference region being suited to selfie photography.

The present invention, in an aspect thereof, is directed to a control device that controls an electronic device including at least one image capturing device and at least one display device, the at least one image capturing device being disposed in a peripheral region of a display screen of the display device, the control device including a display control unit configured to display a line-of-sight guidance image on the display screen around an arrangement position of the at least one image capturing device, to guide a line of sight of a human imaging subject to a reference region of the display screen, the reference region being suited to selfie photography.

The present invention, in an aspect thereof, is directed to a method of controlling an electronic device including at least one image capturing device and at least one display device, the at least one image capturing device being disposed in a peripheral region of a display screen of the display device, the method including the display control step of displaying a line-of-sight guidance image on the display screen around an arrangement position of the at least one image capturing device, to guide a line of sight of a human imaging subject to a reference region of the display screen, the reference region being suited to selfie photography.

Advantageous Effects of Invention

The present invention, in an aspect thereof, enables a human imaging subject to simultaneously and easily recognize his/her face and a line-of-sight guidance image on a display screen.

BRIEF DESCRIPTION OF DRAWINGS

Portion (a) of FIG. 1 is a block diagram of a functional configuration of smartphones in accordance with Embodiments 1 to 7 of the present invention, and (b) of FIG. 1 is a front view of the smartphones.

Figure 3:
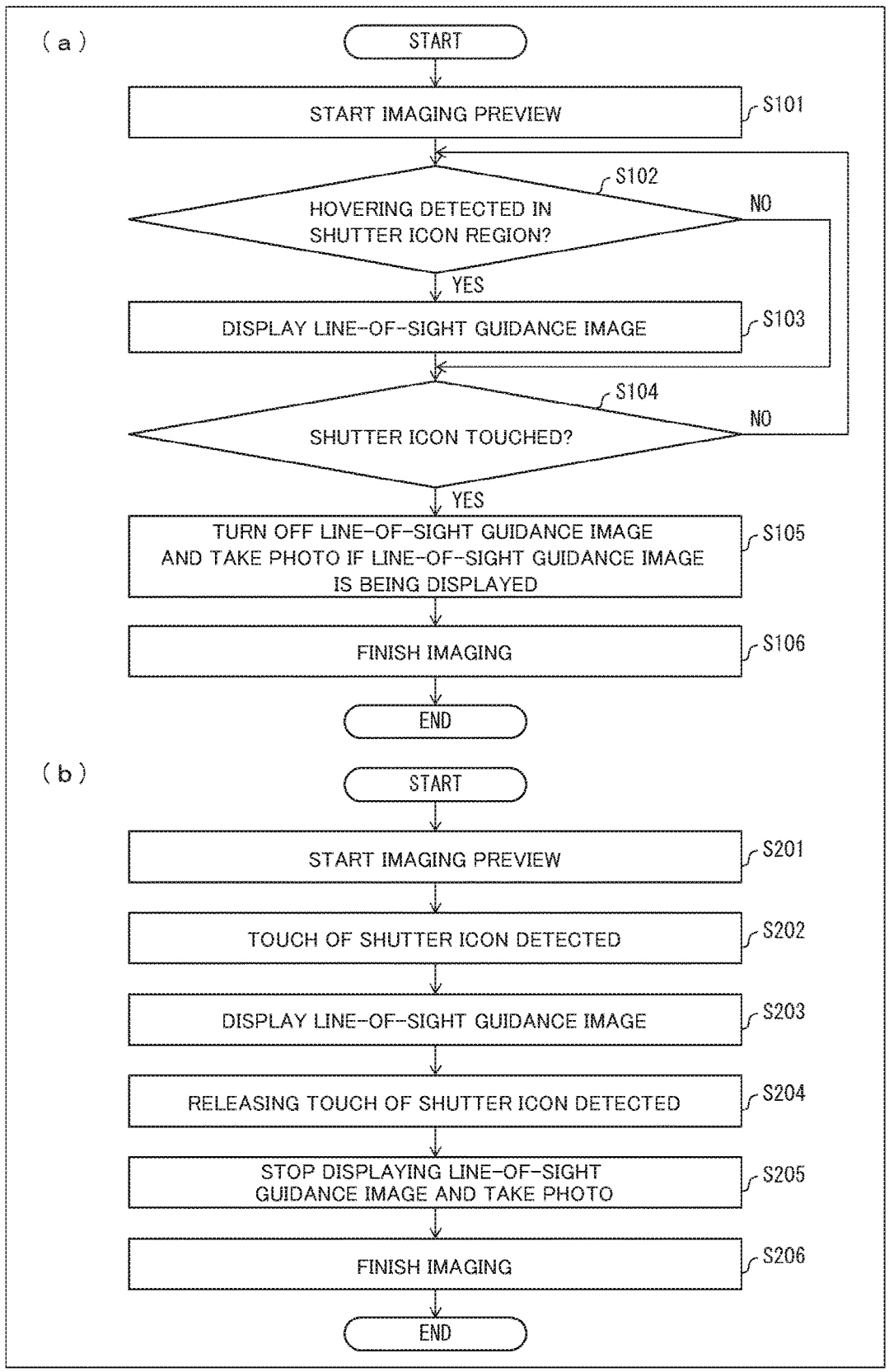

Portion (a) of FIG. 3 is a flow chart representing an exemplary selfie photography method on the smartphone in accordance with Embodiment 1 of the present invention, and (b) of FIG. 3 is a flow chart representing another exemplary selfie photography method.

Figure 4:
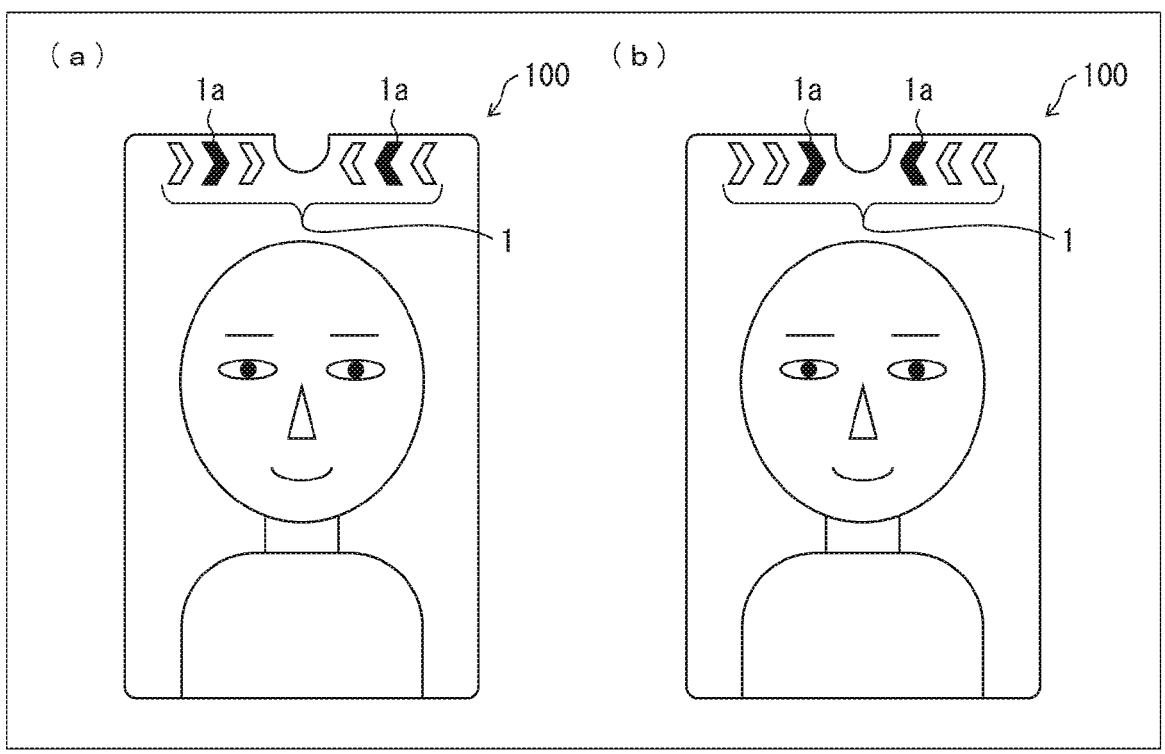

Portions (a) and (b) of FIG. 4 are a set of illustrations of variation examples of the display screen that appears following an input of a selfie photography command.

Figure 5:
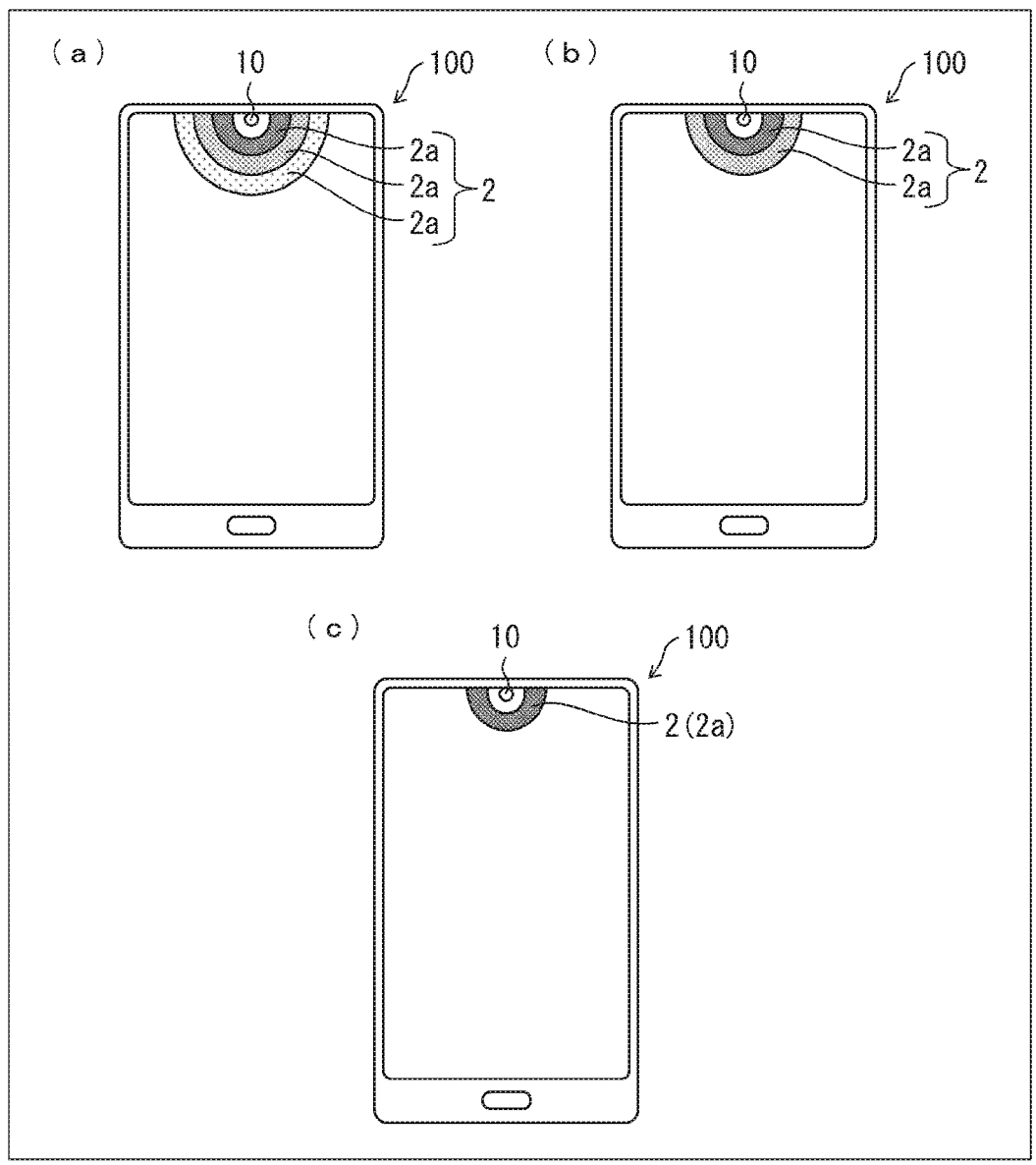

Portions (a) to (c) of FIG. 5 are a set of illustrations of variation examples of the display screen that appears following an input of a selfie photography command.

Figure 6:
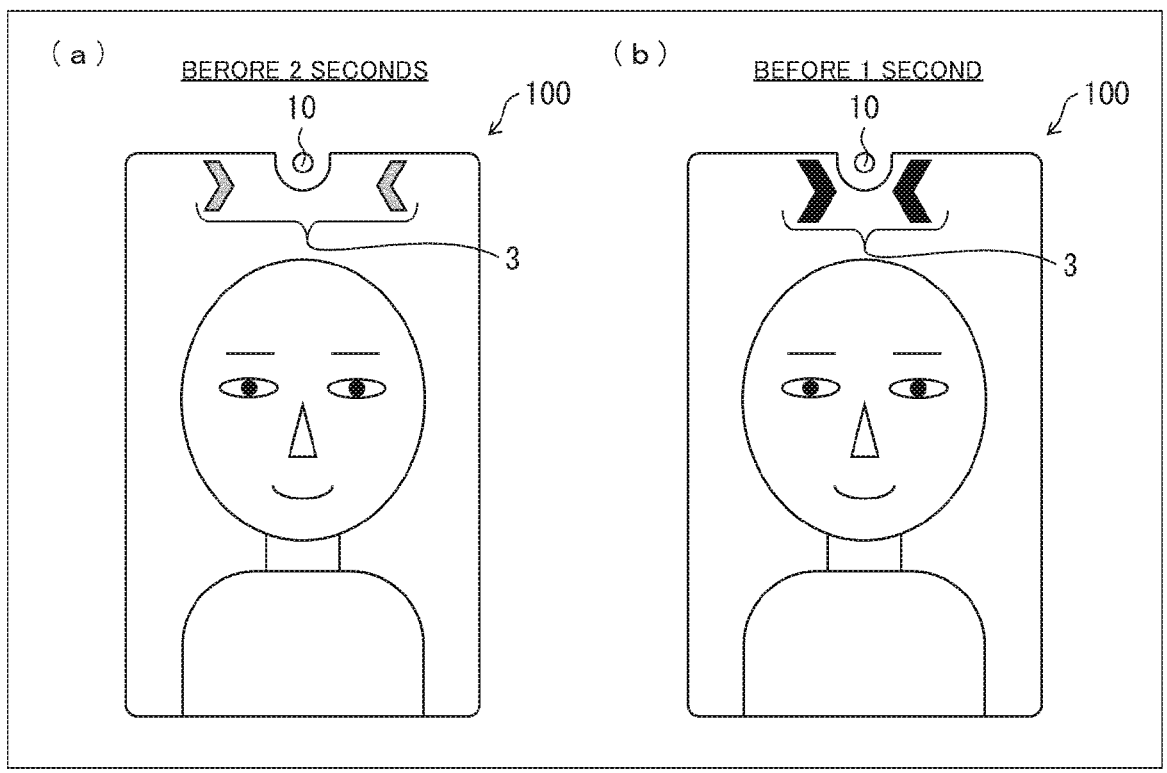

Portions (a) and (b) of FIG. 6 are a set of illustrations of variation examples of the display screen that appears following an input of a selfie photography command.

Figure 7:
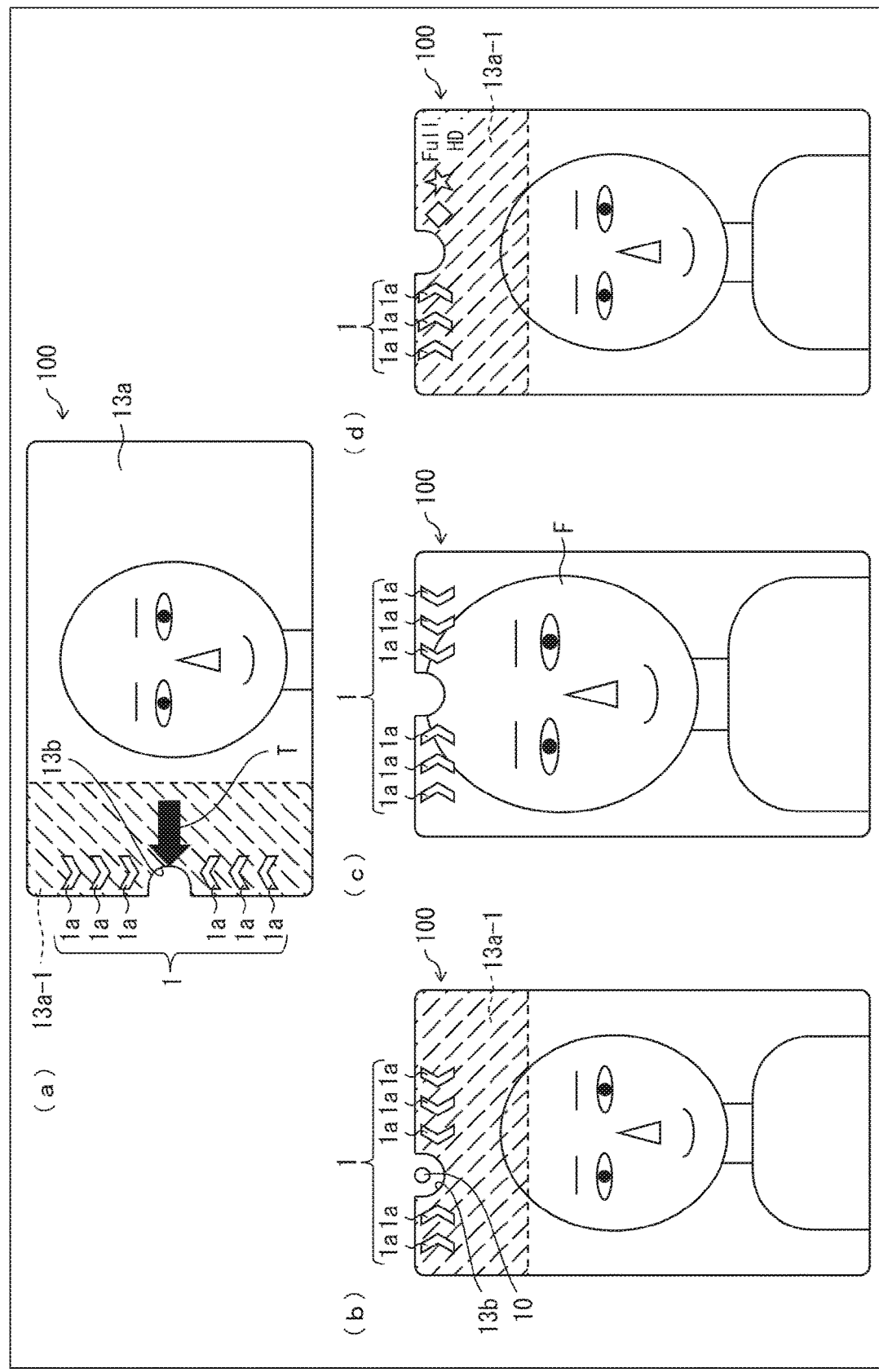

Portions (a) to (d) of FIG. 7 are a set of illustrations of variation examples of the display screen that appears following an input of a selfie photography command.

Figure 8:
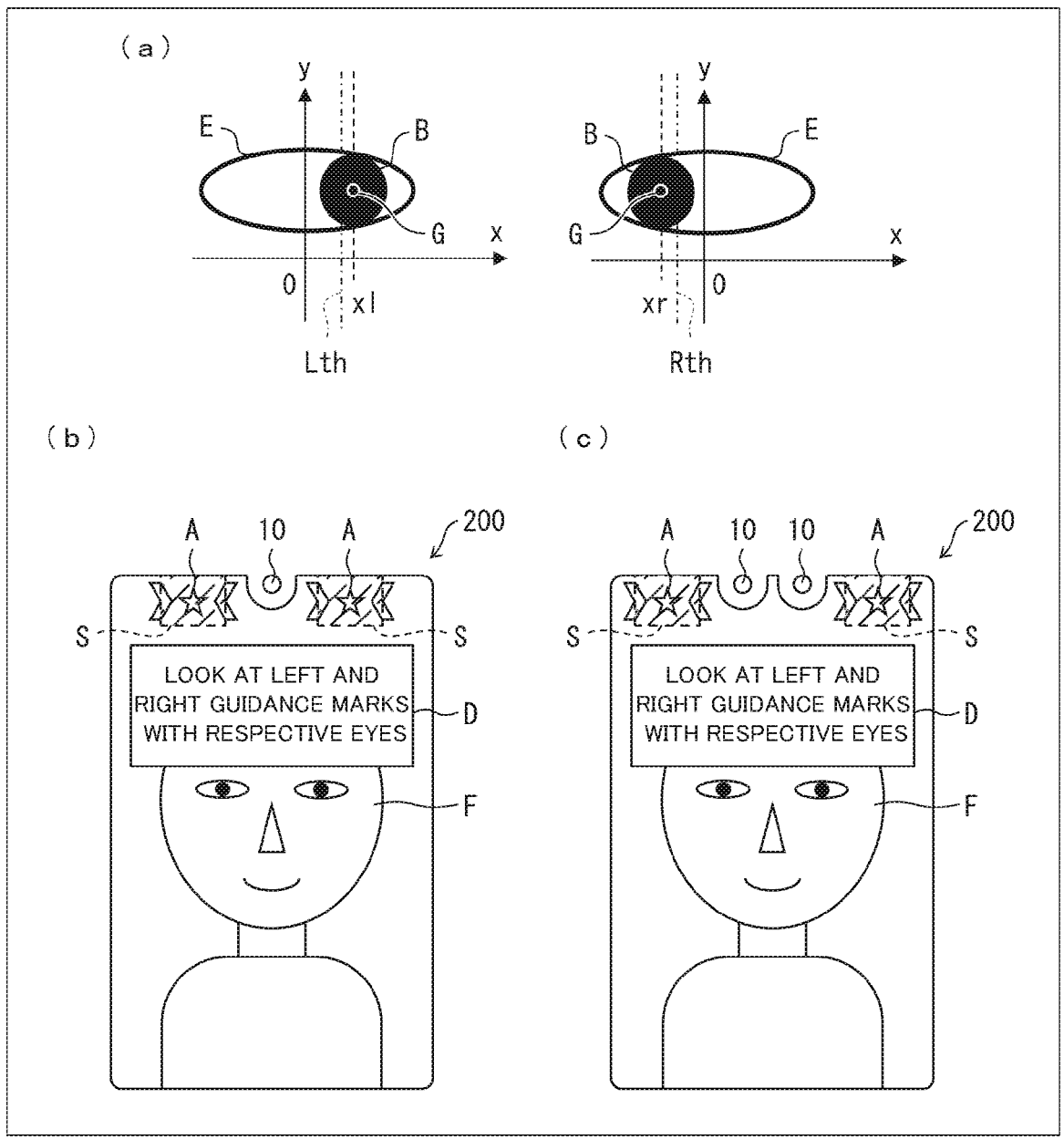

Portion (a) of FIG. 8 is an illustration of an exemplary display screen including auxiliary line-of-sight guidance images on the smartphone in accordance with Embodiment 2 of the present invention, (b) of FIG. 8 is an illustration of how it is determined whether or not the user's line of sight is being directed at a camera, and (c) of FIG. 8 is an illustration of a variation example of the display screen including auxiliary line-of-sight guidance images.

Figure 9:
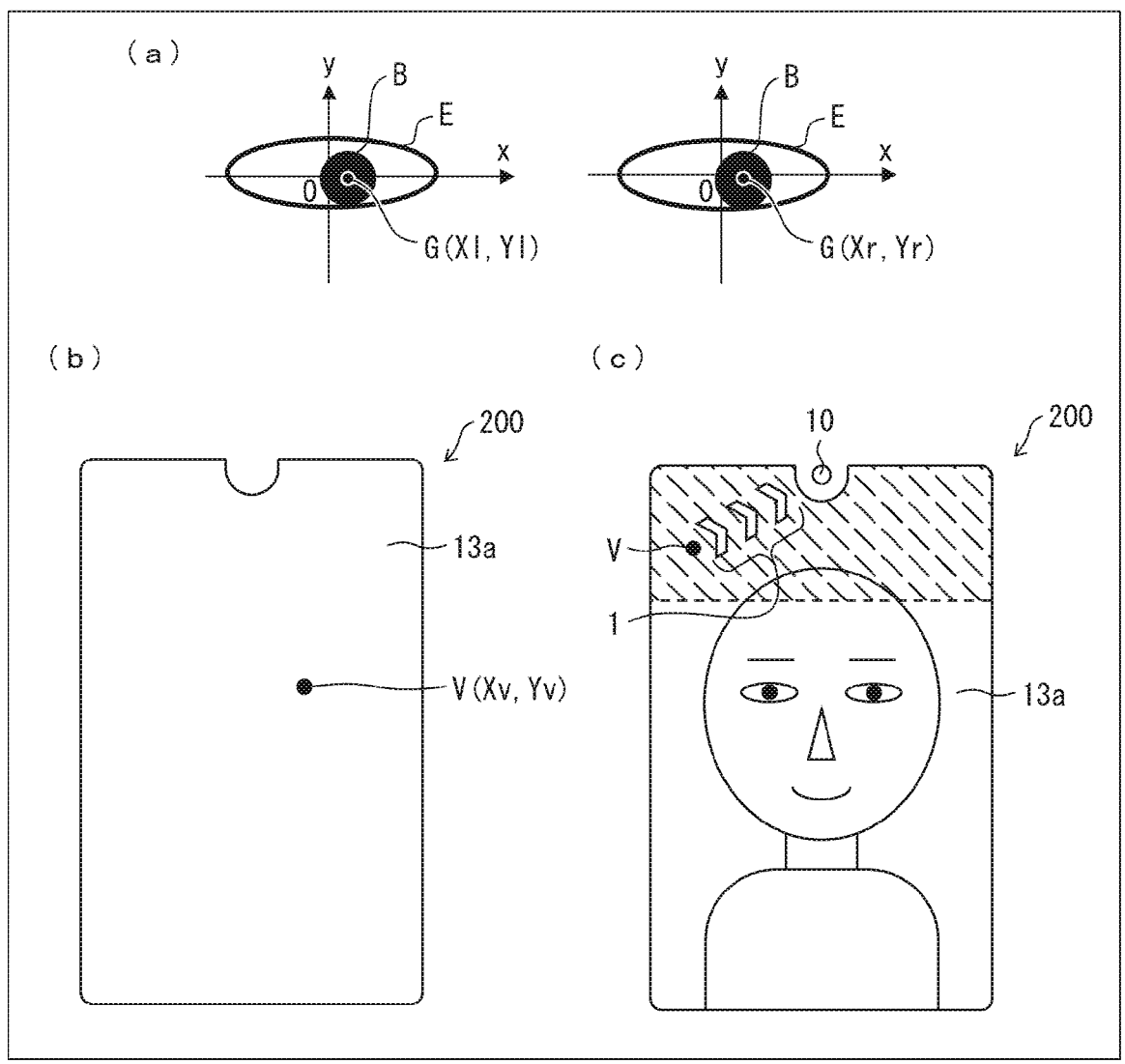

Portion (a) of FIG. 9 is an illustration of an exemplary display arrangement for a line-of-sight guidance image on the smartphone in accordance with Embodiment 2 of the present invention, and (b) and (c) of FIG. 9 are a set of illustrations of how a line-of-sight position is determined.

Figure 10:
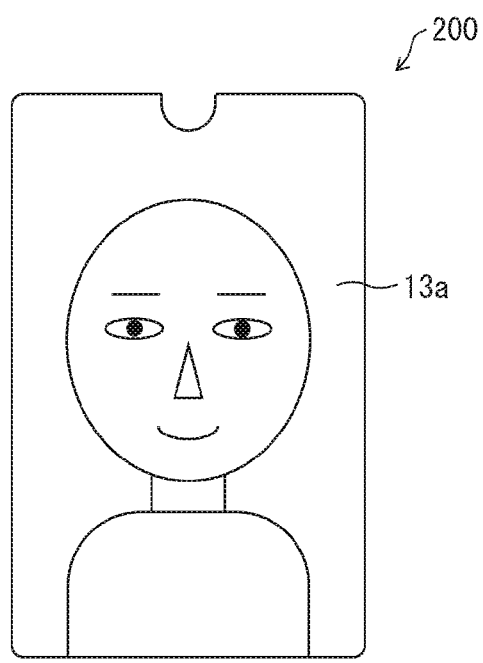

FIG. 10 is an illustration of an exemplary display screen on the smartphone in accordance with Embodiment 2 of the present invention, where the display of the line-of-sight guidance image is turned off.

Figure 11:
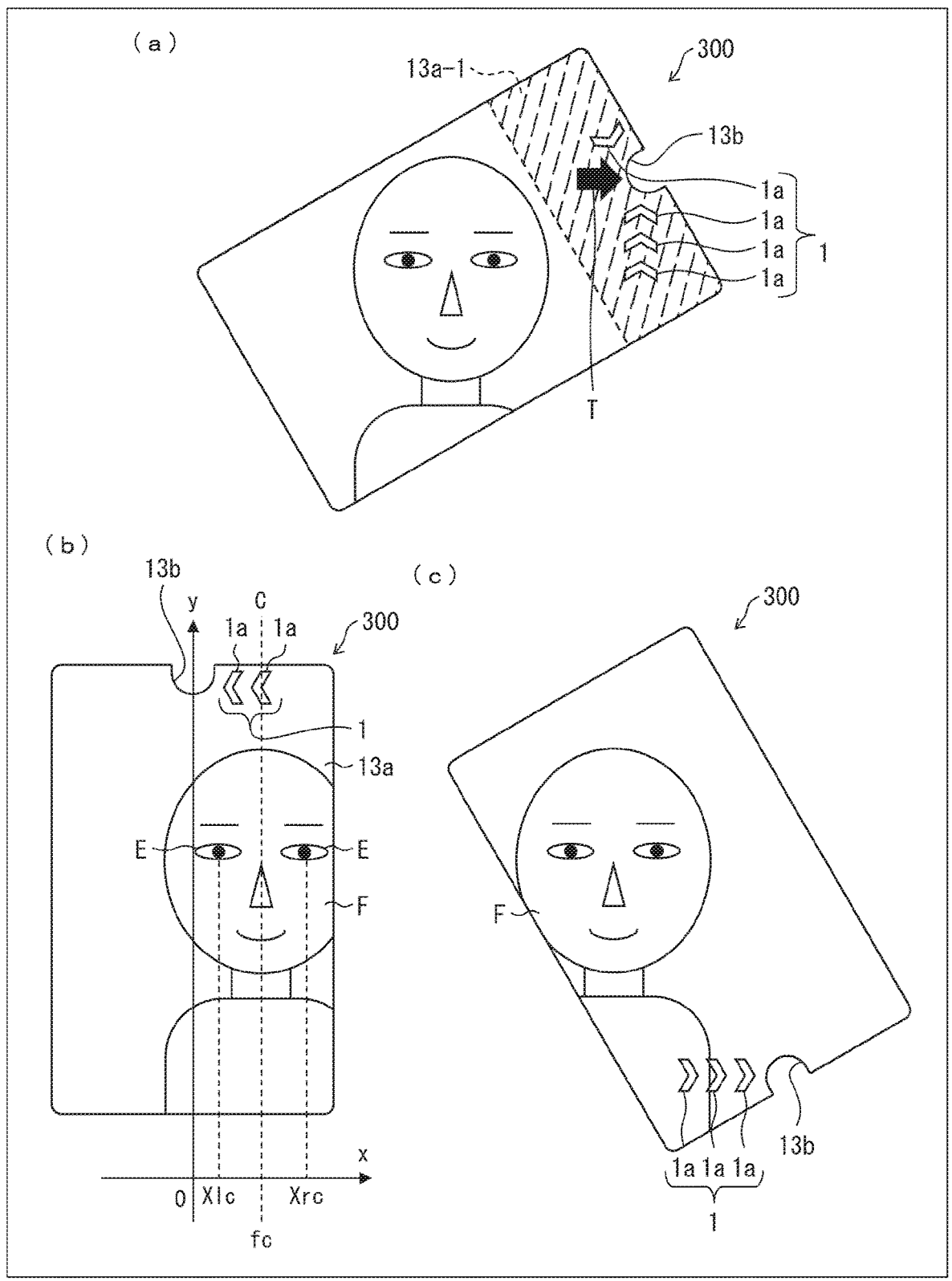

Portion (a) of FIG. 11 is an illustration of an exemplary display screen that appears following a start of selfie photographing on the smartphone in accordance with Embodiment 3 of the present invention, (b) of FIG. 11 is an illustration of another exemplary display screen that appears following a start of selfie photographing, and (c) of FIG. 11 is an illustration of a variation example of the display screen that appears following a start of selfie photographing.

Figure 12:
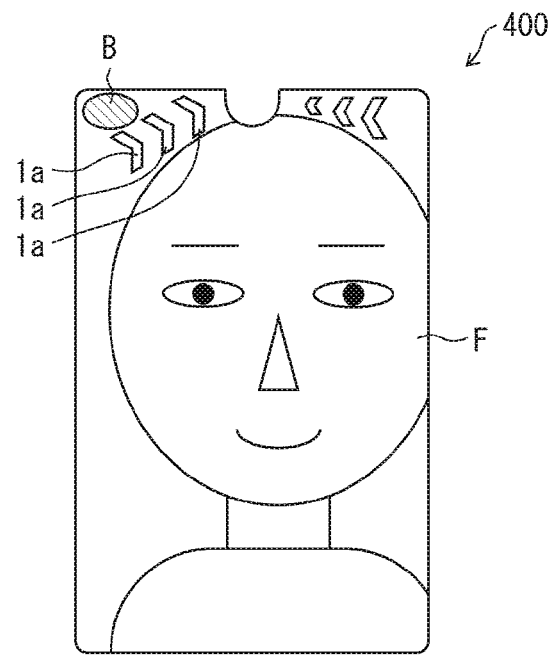

FIG. 12 is an illustration of an exemplary display screen that appears following a start of selfie photographing on the smartphone in accordance with Embodiment 4 of the present invention.

Figure 13:
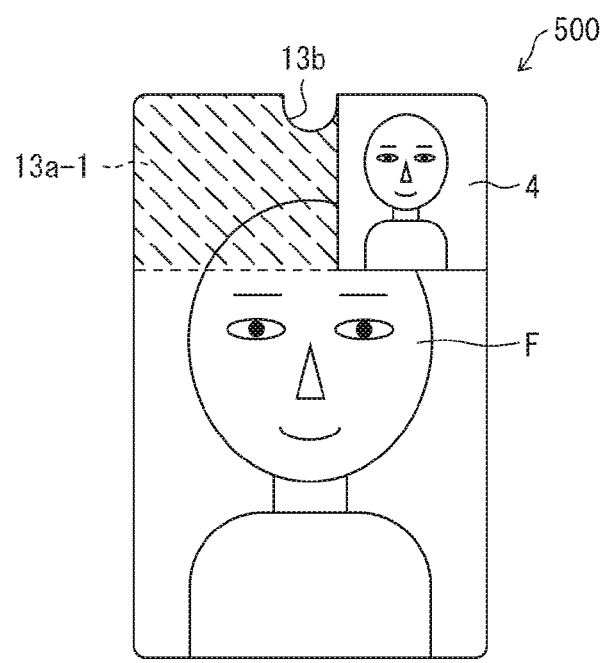

FIG. 13 is an illustration of an exemplary display screen that appears following a start of selfie photographing on the smartphone in accordance with Embodiment 5 of the present invention.

Figure 14:
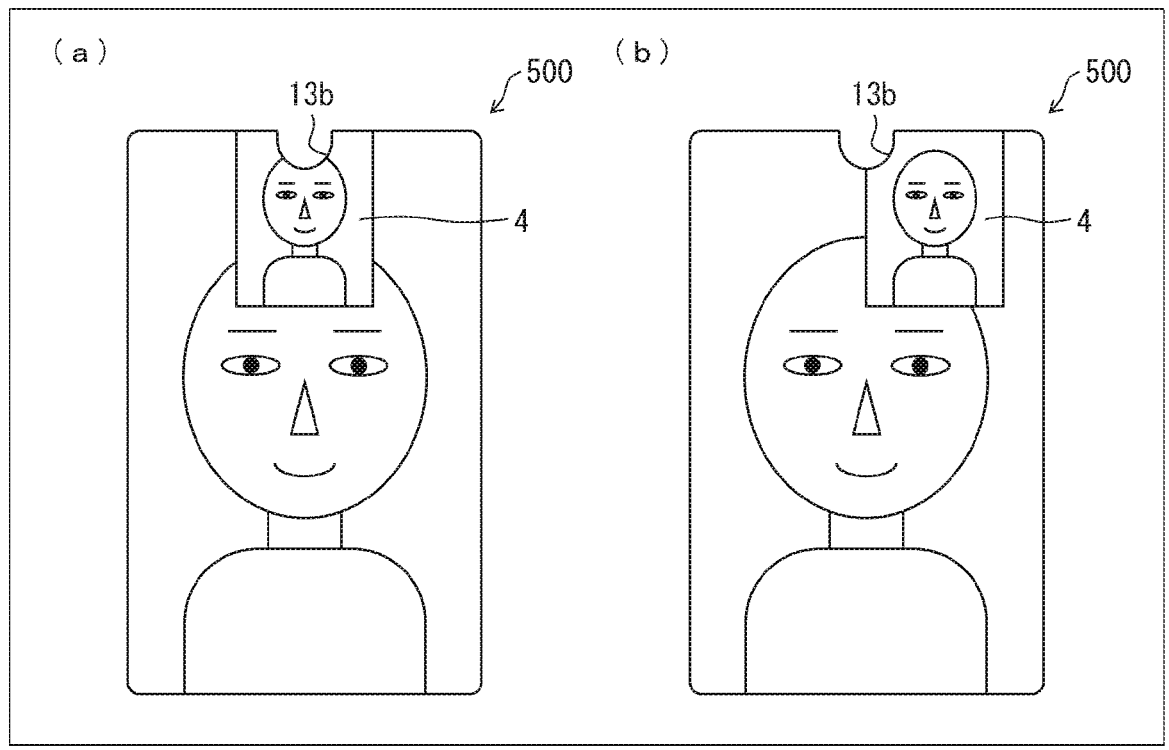

Portions (a) and (b) of FIG. 14 are a set of illustrations of another exemplary display screen that appears following a start of selfie photographing.

Figure 15:
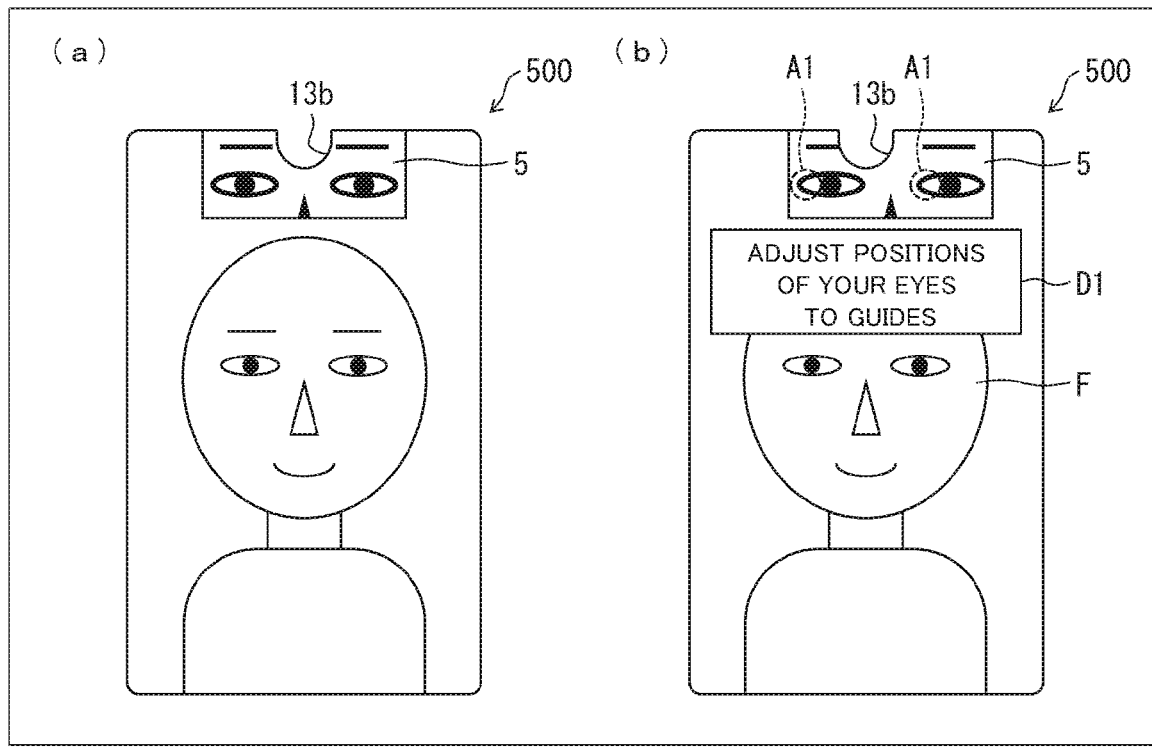

Portions (a) and (b) of FIG. 15 are a set of illustrations of another exemplary display screen that appears following a start of selfie photographing.

Figure 16:
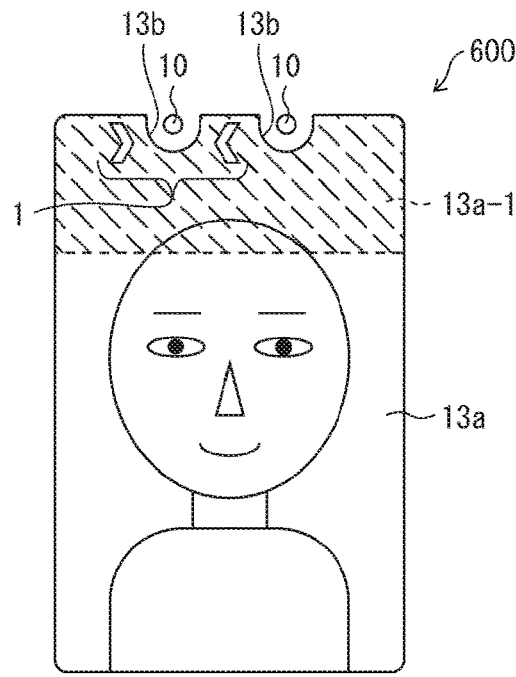

FIG. 16 is an illustration of an exemplary display screen that appears following a start of selfie photographing on the smartphone in accordance with Embodiment 6 of the present invention.

Figure 17:
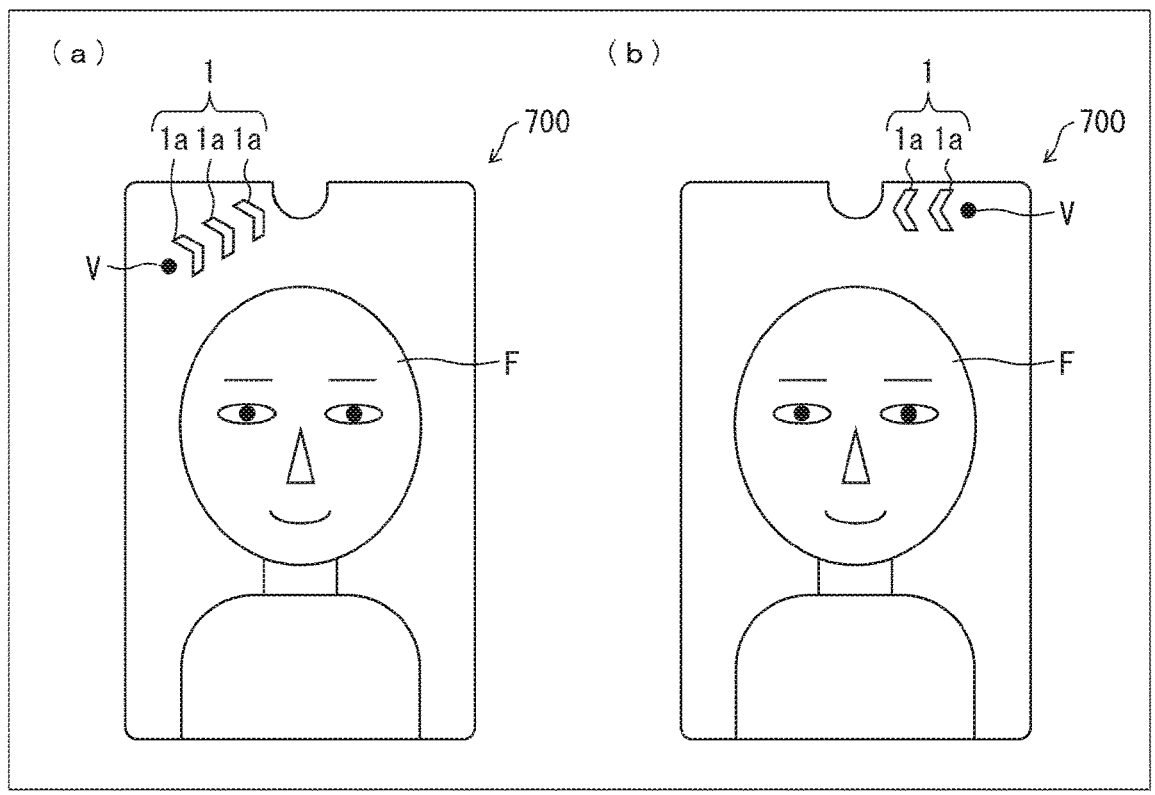

Portions (a) and (b) of FIG. 17 are a set of illustrations of an exemplary display screen that appears following a start of selfie photographing on the smartphone in accordance with Embodiment 7 of the present invention.

DESCRIPTION OF EMBODIMENTS

For convenience of description, members of Embodiment 1 that have the same function as members described in relation to a specific matter are indicated by the same reference numerals, and description thereof may be omitted. The same convention applies to Embodiment 2 and subsequent embodiments. In the present and subsequent embodiments, the electronic device of an aspect of the present invention may include either a single or plural image capturing devices, display devices, control devices, and like elements/devices/members.

Configuration of Smartphone

A smartphone 100 (electronic device) is a multifunctional mobile phone that also functions, for example, as a personal computer and a PDA (personal digital assistant, or mobile information terminal). The same description applies to smartphones 200 to 700 which will be described later in detail. The present invention is applicable, for example, to electronic devices such as mobile phones and tablet computers as well as to smartphones. The smartphone 100, as shown in (a) of FIG. 1, includes a camera 10 (image capturing device), a storage device 11, a user input device 12, a display device 13, and a control device 14.

The camera 10 includes lenses, an image sensor such as a CMOS (complementary metal-oxide semiconductor), and an autofocus mechanism. Referring next to (b) of FIG. 1, the camera 10 is disposed inside a notch 13b formed in a peripheral region 13a-1 of a display screen 13a of the display device 13.

The peripheral region 13a-1 of the display screen 13a refers collectively to all those parts of the display screen 13a along the lengthwise and widthwise edges of the display screen 13a. In the present embodiment, the peripheral region 13a-1 refers to a region near a widthwise end of the display screen 13a, as indicated in (b) of FIG. 1. The notch 13b is not necessarily formed in the peripheral region 13a-1. In other words, the camera 10 needs only to be disposed in the peripheral region 13a-1.

The storage device 11 is built around, for example, a ROM (read-only memory) or a RAM (random access memory) to store data necessary for the operations of the component devices of the smartphone 100. The storage device 11 may be provided, for example, in the control device 14 or external to the smartphone 100.

The user input device 12 includes, for example, a touch panel and circuitry for processing user inputs. The user input device 12 detects inputs by the user (human imaging subject) and detects a finger of the user hovering over (moving into the proximity of) or touching (moving into contact with) an area of the display screen 13a. The user input device 12 also calculates, for example, the location of the cursor on the display screen 13a.

The display device 13 includes, for example, the touch panel and circuitry for display processing, to display various images and a cursor on the display screen 13a of the touch panel. The touch panel functions as a part of the user input device 12 and a part of the display device 13.

The present and subsequent embodiments describe as an example a touch panel provided by integrating a part of the user input device 12 and a part of the display device 13. Alternatively, the user input device 12 and the display device 13 may be provided as separate devices.

The control device 14 is, for example, a CPU and collectively controls the component devices of the smartphone 100 by executing programs contained in the storage device 11. The control device 14 further includes a display control unit 14a as shown in (a) of FIG. 1.

The display control unit 14a performs a display process for displaying a line-of-sight guidance image 1 (see FIG. 2) on the display screen 13a around the arrangement position of the camera 10. In the present embodiment, the line-of-sight guidance image 1 is displayed around the arrangement position of the camera 10 in response to a user command input for selfie photography (image capturing command input).

The term, "selfie photography," as used in the present embodiment encompasses the user taking his/her photos using the camera 10 by checking his/her own images on the display screen 13a. The term further encompasses a non-user human imaging subject taking his/her photos using a self-timer function by checking his/her own images on the display screen 13a.

The term, "human imaging subject," refers to a person who takes his/her own photos by "selfie photography." Accordingly, the "human imaging subject" refers to anyone who takes his/her own photos by "selfie photography," including the user.

An input of a user command for selfie photography may be made, for example, by hovering over or touching a shutter icon region (not shown) of the display screen 13a. The line-of-sight guidance image 1 may be displayed at all times around the arrangement position of the camera 10 when and after the display screen 13a switches to a preview screen, regardless of whether or not there is a command input for selfie photography.

The line-of-sight guidance image 1 is for guiding the user's line of sight to a reference region of the display screen 13a suited to selfie photography (image capturing on an image capturing device). In the present and subsequent embodiments, the "reference region" refers to a location on the display screen 13a at which the user can look from the front of the smartphone 100 and more specifically to those parts of the peripheral region 13a-1 that are located proximate to, or on the sides of, the notch 13b (see (a) of FIG. 8). The reference region may have a specific numerical value range specified in any appropriate manner, for example, altered in response to a user input on the user input device 12. Alternatively, the display control unit 14a may have a plurality of numerical value ranges stored in advance in a memory thereof (not shown), so that the display control unit 14a can select an optimal numerical value range from the plurality of numerical value ranges in accordance with the location of the user's face on the display screen 13a.

The present and subsequent embodiments assume the user taking selfie photos as a situation where a line-of-sight guidance image in accordance with an aspect of the present invention is displayed on a display screen of a smartphone (electronic device). This assumption is however a mere example, and the present invention is also applicable to, for example, the taking of a photo of a non-user human imaging subject by using a self-timer function. In other words, the line-of-sight guidance image in accordance with an aspect of the present invention is displayed on the display screen generally when taking a photo of a human imaging subject using a camera (image capturing device) on the smartphone.

Display of Line-of-Sight Guidance Image

Figure 2:
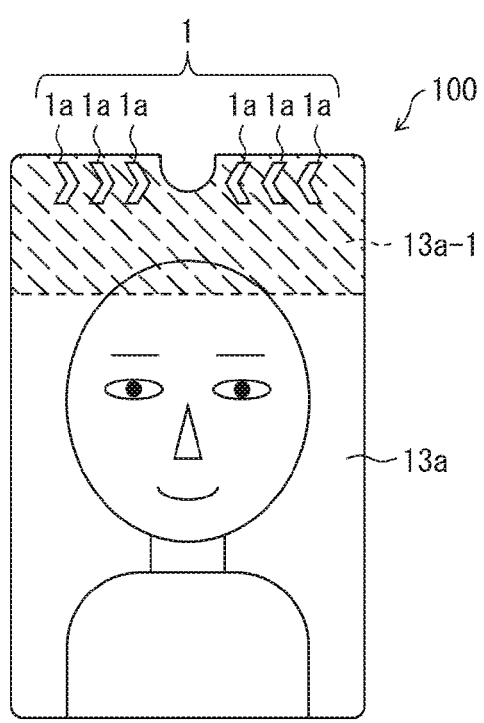
FIG. 2 is an illustration of an exemplary display screen that appears following an input of a selfie photography command on the smartphone in accordance with Embodiment 1 of the present invention.

The line-of-sight guidance image 1 includes six partial line-of-sight guidance images 1a as shown in FIG. 2. The six partial line-of-sight guidance images 1a are divided into two groups each of three of them. These two groups are displayed on the sides of the notch 13b along the width of the peripheral region 13a-1 (the left/right direction as viewed in the drawing) in such a manner as to flank the notch 13b. The region "around the arrangement position of the camera 10" in the present embodiment refers to those parts of the peripheral region 13a-1 that are located on the sides of the notch 13b.

Each partial line-of-sight guidance image 1a is shaped like an arrow head. The three partial line-of-sight guidance images 1a in each group have their tips on the bends pointing in the same direction. All the partial line-of-sight guidance images 1a are displayed in such a manner that their tips on the bends point at the camera 10.

The number and shape of the partial line-of-sight guidance images 1a are not necessarily limited to those in the example shown in FIG. 2. For instance, the partial line-of-sight guidance image 1a may be shaped like an arrow. In addition, the line-of-sight guidance image 1 is not necessarily constituted by the partial line-of-sight guidance images 1a and may be a single pictorial figure (e.g., an arrow head or an arrow). The display position and display arrangement of the line-of-sight guidance image 1 and the number of the partial line-of-sight guidance images 1a may be varied in a suitable manner in the present and subsequent embodiments.

Selfie Photography Method

Selfie photos may be taken on the smartphone 100 by the methods shown in (a) and (b) of FIG. 3 (the same methods can be used on the smartphones 200 to 700 detailed later).

A first method is to display the line-of-sight guidance image 1 when hovering is detected over a shutter icon region of the display screen 13a and perform selfie photographing when a touch is detected in the shutter icon region, as shown in (a) of FIG. 3.

Specifically, the control device 14 switches the display screen 13a to a preview screen to start an imaging preview in step (hereinafter, abbreviated to "S") 101. The control device 14 thereafter determines whether or not hovering has been detected in the shutter icon region (S102).

If the result of step S102 is YES (hereinafter, abbreviated to "Y"), the display control unit 14a of the control device 14 implements controls to display the line-of-sight guidance image 1 on the display screen 13a around the arrangement position of the camera 10 (S103: display step). The process then proceeds to step S104. On the other hand, if the result of step S102 is NO (hereinafter, abbreviated to "N"), the process proceeds to step S104 without the display control unit 14a implementing controls to display the line-of-sight guidance image 1.

The control device 14, in step S104, determines whether or not a touch has been detected in the shutter icon region. If the result of step S104 is "Y," the control device 14 closes the shutter of the camera 10 (S105), which completes selfie photographing (S106). If the line-of-sight guidance image 1 is still being displayed in selfie photographing, the display control unit 14a turns off the display of the line-of-sight guidance image 1.

On the other hand, if the result of step S104 is N, the control device 14 repeats the process starting at S102.

A second method is to display the line-of-sight guidance image 1 when a touch is detected in the shutter icon region on the display screen 13a and perform selfie photographing when a touch is no longer detected in the shutter icon region, as shown in (b) of FIG. 3.

Specifically, the control device 14 switches the display screen 13a to a preview screen to start an imaging preview in step S201. The process then proceeds to step S202. In response to the control device 14 detecting a touch in the shutter icon region in step S202, the display control unit 14a implements controls to display the line-of-sight guidance image 1 on the display screen 13a around the arrangement position of the camera 10 (S203: display step).

In response to the control device 14 no longer detecting a touch in the shutter icon region in step S204, the control device 14 closes the shutter of the camera 10 (S205), which completes selfie photographing (S206). If the line-of-sight guidance image 1 is still being displayed in selfie photographing, the display control unit 14a turns off the display of the line-of-sight guidance image 1.

Variation Examples of Line-of-Sight Guidance Image

The shape and display arrangement of the line-of-sight guidance image in accordance with the present embodiment may vary from those of the line-of-sight guidance image 1 shown in FIG. 2. For instance, as shown in FIG. 4, a different set of partial line-of-sight guidance images 1a may be highlighted in the line-of-sight guidance image 1 at prescribed timings.

Specifically, the display control unit 14a of the control device 14 highlights those partial line-of-sight guidance images 1a that appear farthest from the arrangement position of the camera 10 immediately after a user command input for selfie photography. Then, for each second from that, the display control unit 14a highlights those partial line-of-sight guidance images 1a that are one position closer to the arrangement position of the camera 10 as shown in (a) and (b) of FIG. 4. After highlighting those partial line-of-sight guidance images 1a located closest to the arrangement position of the camera 10, the control device 14 performs selfie photographing. The prescribed timings are not necessarily every one second and may be altered in a desirable manner (the same variations are applicable throughout the following description).

The line-of-sight guidance image 1 may be replaced, for example, by a semicircular line-of-sight guidance image 2 around the arrangement position of the camera 10 as shown in FIG. 5. The line-of-sight guidance image 2 includes three partial line-of-sight guidance images 2a that resemble concentric circles around the arrangement position. The number of the partial line-of-sight guidance images 2a may be altered in a desirable manner.

Specifically, in response to a user command input for selfie photography, the display control unit 14a implements controls to display the three partial line-of-sight guidance images 2a as shown in (a) of FIG. 5 in a display process. Thereafter, for each second (at prescribed timings) from that, the display control unit 14a sequentially turns off the display of the partial line-of-sight guidance images 2a starting from the one located farthest from the arrangement position of the camera 10 as shown in (b) and (c) of FIG. 5. After turning off the display of the partial line-of-sight guidance image 2a that is closest to the arrangement position, the control device 14 performs selfie photographing.

As a further alternative, the line-of-sight guidance image 1 may be replaced by a line-of-sight guidance image 3 that is displayed in a different location at each timing as shown in FIG. 6. The line-of-sight guidance image 3 has the same shape as the line-of-sight guidance image 1 and includes no partial line-of-sight guidance images.

Specifically, the display control unit 14a implements controls to display the line-of-sight guidance image 3 in a prescribed location that is at a distance from the arrangement position of the camera 10 in a display process immediately after a user command input for selfie photography. Then, for each second from that, the display control unit 14a implements controls to display the line-of-sight guidance image 3 in such a manner that the line-of-sight guidance image 3 approaches the arrangement position of the camera 10 as shown in (a) and (b) of FIG. 6. After the line-of-sight guidance image 3 has come closest to the arrangement position of the camera 10, the control device 14 performs selfie photographing.

As yet another alternative, the line-of-sight guidance image 1 may be displayed in various locations as shown in (a) to (c) of FIG. 7. If the smartphone 100 is positioned so that the length of the display screen 13a coincides with the left/right direction as viewed in the drawing, as shown in (a) of FIG. 7, the display control unit 14a may implement controls to display two groups of partial line-of-sight guidance images 1a along the extension of the peripheral region 13a-1, that is, in the up/down direction as viewed in the drawing, in such a manner that the two groups of partial line-of-sight guidance images 1a flank the notch 13b.

The display control unit 14a may implement controls to display, near the notch 13b, an arrow-shaped target image T having a tip pointing at the center of the camera 10 in order to allow adjustment of the height of the line of sight. By looking at this target image, the user can more certainly direct his/her line of sight to the reference region.

If the notch 13b is formed off the central axis (not shown) extending along the length of the display screen 13a in the peripheral region 13a-1 of the display screen 13a as shown in (b) of FIG. 7, and the camera 10 is disposed in the notch 13b, the display control unit 14a may implement controls to display fewer partial line-of-sight guidance images 1a in a smaller half of the peripheral region 13a-1 than in a larger half of the peripheral region 13a-1.

The display control unit 14a may implement controls to display the line-of-sight guidance image 1 in such a manner that some of the partial line-of-sight guidance images 1a overlap a part of a second image F of the user's face as shown in (c) of FIG. 7. The display control unit 14a controls the display in such a manner that none of the partial line-of-sight guidance images 1a overlaps a part of the second image F to the extent that the user cannot easily recognize the second image F and the line-of-sight guidance image 1 simultaneously.

As a further alternative, the display control unit 14a may implement controls to display the line-of-sight guidance image 1 only on one side of the notch 13b and to display various icons and other images on the other side in the peripheral region 13a-1 of the display screen 13a as shown in (d) of FIG. 7. This display arrangement enables the user to manipulate the smartphone 100 using icons while keeping his/her line of sight to the reference region, thereby enhancing the operability of the smartphone 100.

Embodiment 2

Figure 1:
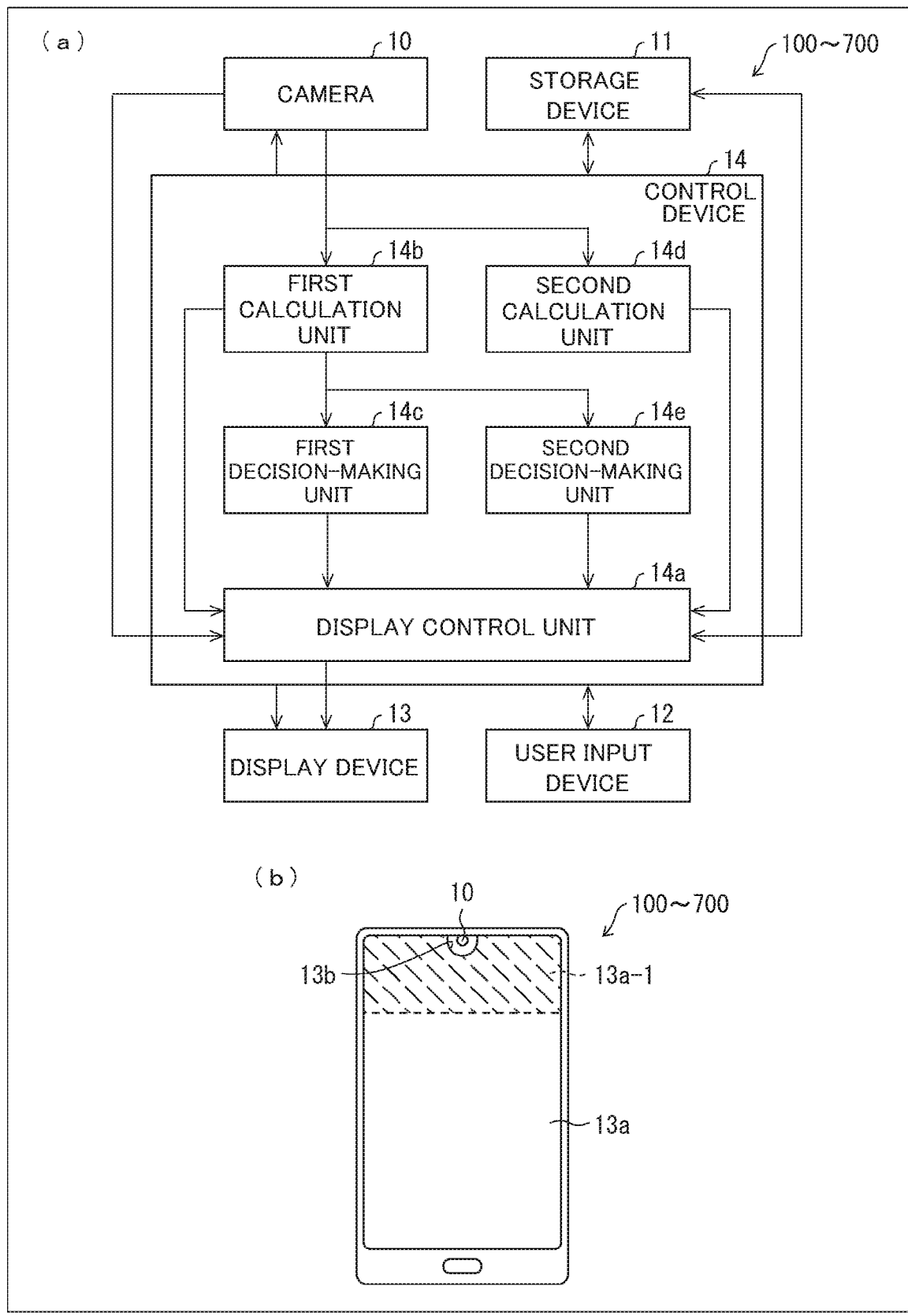

As shown in (a) of FIG. 1, a smartphone 200 differs from the smartphone 100 of Embodiment 1 in that the control device 14 of the smartphone 200 further includes a first calculation unit 14b, a first decision-making unit 14c, and a second decision-making unit 14e.

Display of Auxiliary Line-of-Sight Guidance Images

The first calculation unit 14b analyzes first images E of the eyes of the user to perform a first calculation process to calculate the center-of-gravity locations G of the pupils of the user. Each center-of-gravity location G is the location of the center of gravity of a pupil of the user with reference to the center of the eye of the user.

A description will be now given of the first calculation process. The first calculation unit 14b first acquires the second image F captured by the camera 10 and extracts the first images E shown in (a) of FIG. 8 (the right eye shown in the right-hand side and the left eye shown in the left-hand side as viewed in the drawing) from the second image F. Then, the first calculation unit 14b, for both the left and right eyes, extracts a third image B of a pupil of the user from the first image E and calculates the x-coordinate of the center-of-gravity location G in the third image B (Xr for the right eye and Xl for the left eye) with reference to the x-coordinate of the center of the first image E (X=0).

In the present embodiment, the x-axis is designated parallel to a line extending from the inner corner of the eye to the outer corner of the eye in the first image E, and the y-axis is designated perpendicular to the x-axis and passing through the center of the first image E. In addition, the positive x-axis direction points at the right-hand side as viewed in the drawing, and the positive y-axis direction points upward as viewed in the drawing. The same designation applies to (a) of FIG. 9 and (b) of FIG. 11.

The first decision-making unit 14c compares the x-coordinates of the center-of-gravity locations G calculated by the first calculation unit 14b with threshold values to perform a first decision-making process where it is determined whether or not the user's line of sight is being directed at the camera 10.

A description will be now given of the first decision-making process. In the present embodiment, the center-of-gravity location G of the right eye is compared with a threshold value Rth, and the center-of-gravity location G of the left eye is compared with a threshold value Lth. Both the threshold values Rth and Lth may be varied in a desirable manner.

The first decision-making unit 14c first compares the x-coordinate Xr of the center-of-gravity location G of the right eye with the threshold value Rth and compares the x-coordinate Xl of the center-of-gravity location G of the left eye with the threshold value Lth. If the results of the comparisons are such that "Xr<Rth and Xl>Lth" as shown in (a) of FIG. 8, the first decision-making unit 14c determines that the user's line of sight is being directed at the camera 10. On the other hand, if the results of the comparisons are otherwise, the first decision-making unit 14c determines that the user's line of sight is not being directed at the camera 10.

This decision-making criterion is not the only possibility. As an alternative example, the first decision-making unit 14c may determine that the user's line of sight is being directed at the camera 10 if any one of conditions, Xr<Rth and Xl>Lth, is satisfied.

If the first decision-making unit 14c has determined that the user's line of sight is being directed at the camera 10, the display control unit 14a implements controls to display auxiliary line-of-sight guidance images A in a reference region S in a display process as shown in (b) of FIG. 8. The auxiliary line-of-sight guidance images A are images for guiding the user's line of sight to the reference region and displayed so as to look like stars on the display screen 13a in the present embodiment. The auxiliary line-of-sight guidance images A may be varied in shape and other properties in a desirable manner.

The display control unit 14a implements controls to display, as well as the auxiliary line-of-sight guidance images A, an illustrative image D overlapping a part of the second image F that represents the head of the user. The illustrative image D is a display for prompting the user to adjust his/her line of sight to the auxiliary line-of-sight guidance images A and contains in a rectangular frame a message, "Look at the left and right guidance marks with the respective eyes."

The display of the illustrative image D enables the user to clearly understand that he/she has to adjust his/her line of sight to the auxiliary line-of-sight guidance images A. The user can hence more certainly provide a line-of-sight position that is suited to selfie photography. The illustrative image D may be varied in its content, position, and other properties in a desirable manner. In addition, the illustrative image D may not be displayed even when the auxiliary line-of-sight guidance images A are displayed.

The display control unit 14a may implement controls to display the auxiliary line-of-sight guidance images A and the illustrative image D even if the smartphone 200 includes two cameras 10 to allow three-dimensional selfie photography as shown in (c) of FIG. 8. The same description applies when the smartphone 200 includes three or more cameras 10.

Changes in Display Arrangement of Line-of-Sight Guidance Image

The first calculation unit 14b analyzes the first images E to further perform a second calculation process to calculate a line-of-sight position V. The line-of-sight position V is a location that corresponds to the user's line of sight on the display screen 13a.

A description will be given of the second calculation process. The first calculation unit 14b first extracts the third images B of the pupils of the user from the first images E in the same manner as in the first calculation process. Then, the first calculation unit 14b, for both the left and right eyes, calculates the coordinate of the center-of-gravity location G in the third image B with reference to the coordinate of the center of the first image E (X=0, Y=0). The y-coordinate of the center-of-gravity location G in the third image B is denoted by Yr for the right eye and by Yl for the left eye, as shown in (a) of FIG. 9.

Next, the first calculation unit 14b calculates the coordinates, (Xv, Yv), of the line-of-sight position V on the display screen 13a using the coordinates, (Xr, Yr) and (Xl, Yl), of the center-of-gravity locations G See (b) of FIG. 9. The x-coordinate Xv of the line-of-sight position V is calculated using the calculation formula, $Xv=Ax\times(Xr+Xl)/2$, and the y-coordinate Yv of the line-of-sight position V is calculated using the calculation formula, $Yv=Ay\times(Yr+Yl)/2$. These calculation formulae are mere examples; other calculation formulae may alternatively be used.

The display control unit 14a acquires the results of the second calculation process (the coordinates, (Xv, Yv), of the line-of-sight position V) from the first calculation unit 14b to implement controls to display the line-of-sight guidance image 1 in a region between the line-of-sight position V and the arrangement position of the camera 10 in a display process. It is assumed in this context that the region between the line-of-sight position V and the arrangement position of the camera 10 is within the peripheral region 13a-1.

As an example, if the line-of-sight position V is in the upper left of the second image F as viewed in the drawing (and near the head of the user in the image), the display control unit 14a implements controls to display three partial line-of-sight guidance images 1a in such a manner that these partial line-of-sight guidance images 1a line up from the line-of-sight position V toward the upper right as viewed in the drawing, as shown in (c) of FIG. 9.

Turning off Display of Line-of-Sight Guidance Image

The second decision-making unit 14e checks whether the line-of-sight position V is in the reference region on the basis of the coordinates of the line-of-sight position V calculated by the first calculation unit 14b. If it is ascertained that the line-of-sight position V is in the reference region, the second decision-making unit 14e turns off the display of the line-of-sight guidance image 1 as shown in FIG. 10. On the other hand, if it is not ascertained that the line-of-sight position V is in the reference region, the second decision-making unit 14e implements controls to continue the display of the line-of-sight guidance image 1.

The above-described processes performed by the first calculation unit 14b and the first and second decision-making units 14c and 14e are assumed to be triggered by a user command input for selfie photography. However, this assumption is not essential to the present invention; the processes may be triggered, for example, when the display screen 13a is displaying a preview screen.

The smartphone 200 is not necessarily capable of performing all the processes performed by the first calculation unit 14b and the first and second decision-making units 14c and 14e and may only perform at least any one of the processes. In other words, the smartphone 200 does not necessarily include all of the first calculation unit 14b and the first and second decision-making units 14c and 14e. The smartphone 200 may only include, for example, either the first calculation unit 14b or the first calculation unit 14b and the first decision-making unit 14c, in addition to the configuration of the smartphone 100. Alternatively, the smartphone 200 may only include the first calculation unit 14b and the second decision-making unit 14e.

Embodiment 3

As shown in (a) of FIG. 1, a smartphone 300 differs from the smartphones 100 and 200 of Embodiments 1 and 2 in that the control device 14 of the smartphone 300 further includes a second calculation unit 14d.

Display of Line-of-Sight Guidance Image in Accordance with Tilt of Smartphone

The display control unit 14a changes the display position of the line-of-sight guidance image 1 on the display screen 13a in accordance with the tilt condition of the smartphone 300 in a display process. The tilt of the smartphone 300 is detected by built-in acceleration sensors (not shown) in the smartphone 300. The display control unit 14a changes the display position on the basis of a result of the sensing by the acceleration sensors in a suitable manner.

A description will be now given of the tilting of the smartphone 300. When the smartphone 300 is looked at from the front (on the side of the display screen 13a) and held as in (b) of FIG. 11, the smartphone 300 is described as having no tilt. Using this no-tilt position as a reference, or angle 0°, the smartphone 300 is described as having a tilt when the display screen 13a is rotated to an angle around a central axis (not shown) perpendicular to the display screen 13a as shown in (a) of FIG. 11.

For instance, when the smartphone 300 is tilted as in (a) of FIG. 11, the display control unit 14a implements controls to display partial line-of-sight guidance images 1a in the peripheral region 13a-1 in such a manner that these partial line-of-sight guidance images 1a line up more or less in the up/down direction as viewed in the drawing. Specifically, three partial line-of-sight guidance images 1a are displayed below the notch 13b as viewed in the drawing, and another partial line-of-sight guidance image 1a displayed above the notch 13b as viewed in the drawing.

The display control unit 14a may implement controls to display, near the notch 13b, an arrow-shaped target image T having a tip pointing at the center of the camera 10. If the smartphone 300 constantly changes its tilt condition, the display control unit 14a may change the display position in a suitable manner in accordance with that constantly changing rotation angle of the display screen 13a.

Display of Line-of-Sight Guidance Image in Accordance with Display Arrangement of Second Image The second calculation unit 14d analyzes the second image F to perform a third calculation process to calculate a face-center position C. The face-center position C is a location that corresponds to the center of the face of the user on the display screen 13a.

A description will be given of the third calculation process. The second calculation unit 14d first acquires the second image F captured by the camera 10 and extracts the first images E from the second image F. See (a) of FIG. 8. The second calculation unit 14d then calculates the x-coordinates of the centers for the first left and right images E (Xrc for the right eye and Xlc for the left eye) and calculates the x-coordinate fc of the midpoint of the line segment linking Xrc and Xlc as shown in (b) of FIG. 11. This x-coordinate fc serves as the x-coordinate of the face-center position C. The central axis of the display screen 13a extending along the length of the display screen 13a is taken as the y-axis that gives a reference in the calculation of the x-coordinate fc of the face-center position C in the present embodiment.

The display control unit 14a acquires the result of the third calculation process from the second calculation unit 14d (the x-coordinate fc of the face-center position C) to change the display position of the line-of-sight guidance image 1 in accordance with the location arrangement of the face-center position C with reference to the center of the display screen 13a in a display process. The "center of the display screen 13a" refers to the central axis of the display screen 13a, that is, the y-axis.

The display control unit 14a, in the present embodiment, determines that the second image F is being displayed off the center toward the right (as viewed in the drawing) if fc>0 and determines that the second image F is being displayed off the center toward the left (as viewed in the drawing) if fc<0.

For instance, if it turns out as shown in (b) of FIG. 11 that the second image F is being displayed off the center toward the right as viewed in the drawing, the display control unit 14a implements controls to display a plurality of partial line-of-sight guidance images 1a only to the right of the notch 13b in the peripheral region 13a-1 as viewed in the drawing. The example in (b) of FIG. 11 shows two partial line-of-sight guidance images 1a. Alternatively, the display control unit 14a may implement controls to display only one partial line-of-sight guidance image 1a or three or more partial line-of-sight guidance images 1a.

Variation Examples

It is not necessary to separately implement the aforementioned processes: (i) the display of line-of-sight guidance images in accordance with the tilting of the smartphone and (ii) the display of line-of-sight guidance images in accordance with the display arrangement of the second image. These processes (i) and (ii) may be simultaneously implemented.

For instance, there may be cases where, as shown in (c) of FIG. 11, the smartphone 300 is tilted and the second image F is displayed off the center toward the right or left as viewed in the drawing (the second image F is displayed off the center toward the left as viewed in the drawing in the example shown in (c) of FIG. 11). The display control unit 14a may change the display position of the line-of-sight guidance image 1 by using both the results of sensing by the acceleration sensors and the results of the third calculation process, to address such cases.

In the example shown in (c) of FIG. 11, the display control unit 14a implements controls to display three partial line-of-sight guidance images 1a in the left/right direction as viewed in the drawing and to the left of the notch 13b as viewed in the drawing, in the peripheral region 13a-1.

The above-described processes performed by the second calculation unit 14d and the display control unit 14a are assumed to be triggered by a user command input for selfie photography. However, this assumption is not essential to the present invention; the processes may be triggered, for example, when the display screen 13a is displaying a preview screen.

Embodiment 4

A smartphone 400 in accordance with the present embodiment differs from the smartphones 100 to 300 in accordance with Embodiments 1 to 3 in that the display control unit 14a of the smartphone 400 changes the display position of the line-of-sight guidance image 1 in a suitable manner if the background image contains a subject image B.

The smartphone 400 may or may not include the first and second calculation units 14b and 14d and the first and second decision-making units 14c and 14e. The same description applies to the smartphones 500 and 600 which will be described later in detail.

Display of Line-of-Sight Guidance Image in Accordance with Presence/Absence of Subject Image The display control unit 14a acquires a background image captured by the camera 10 to determine whether or not the background image contains the subject image B. The background image is an image of a background of the user. The subject image B is an image of a subject either behind or beside the user.

Specifically, the display control unit 14a acquires, as a background image, those parts of the captured image other than the second image F where there are small changes in color. If the background image contains an image that has different colors from the background color, the display control unit 14a recognizes the image in those colors as the subject image B.

Upon determining that the background image contains the subject image B, the display control unit 14a changes the display position of the line-of-sight guidance image 1 in accordance with the display position of the subject image B. Specifically, the display control unit 14a implements controls to display the line-of-sight guidance image 1 in such a manner that the line-of-sight guidance image 1 does not overlap the subject image B.

For instance, if the subject image B is being displayed in the upper left corner of the display screen 13a as viewed in the drawing, the display control unit 14a implements controls to display three partial line-of-sight guidance images 1a in a region between the subject image B and the second image F in the peripheral region 13a-1 as shown in FIG. 12. This display of the line-of-sight guidance image 1 not overlapping the subject image B enables the user to simultaneously and easily recognize the three images: the second image F, the subject image B, and the line-of-sight guidance image 1.

The above-described display processes performed by the display control unit 14a are assumed to be triggered by a user command input for selfie photography. However, this assumption is not essential to the present invention; the processes may be triggered, for example, when the display screen 13a is displaying a preview screen. The same description applies to the display processes implemented in Embodiments 5 and 7.

Embodiment 5

A smartphone 500 in accordance with the present embodiment differs from the smartphones 100 to 400 in accordance with Embodiments 1 to 4 in that the display control unit 14a of the smartphone 500 implements controls to display line-of-sight guidance images 4 and 5 instead of the line-of-sight guidance images 1, 2, and 3.

The display control unit 14a acquires the second image F captured by the camera 10 to generate a line-of-sight guidance image 4 by resizing the second image F so as to fit in the peripheral region 13a-1. The display control unit 14a then implements controls to display the generated line-of-sight guidance image 4 in a prescribed location in the peripheral region 13a-1.

The line-of-sight guidance image 4 may be displayed in various display arrangements. For instance, the line-of-sight guidance image 4 may be displayed to the right of the notch 13b in the peripheral region 13a-1 as viewed in the drawing, as shown in FIG. 13. The line-of-sight guidance image 4 and the second image F partially overlap in the example shown in FIG. 13; alternatively, the line-of-sight guidance image 4 may be displayed with reduced dimensions so that the line-of-sight guidance image 4 does not overlap the second image F. This display of the line-of-sight guidance image 4 in the peripheral region 13a-1 enables the user to easily recognize whether or not his/her face is ready for selfie photography.

As another alternative, the line-of-sight guidance image 4 may be displayed in such a manner that the middle part of the line-of-sight guidance image 4 overlaps the notch 13b as shown in (a) of FIG. 14. This display enables the user to recognize whether or not his/her face is ready for selfie photography while easily looking into the camera 10.

The line-of-sight guidance image 4 in the example shown in (a) of FIG. 14 may be designed to be moveable by dragging as shown in (b) of FIG. 14. This design enables the user to have the line-of-sight guidance image 3 displayed in a desirable location, for example, when the user wants to visually check the middle part of the line-of-sight guidance image 4 overlapping the notch 13b or when the user finds the display of the line-of-sight guidance image 3 intrusive.

As a further alternative, the display control unit 14a may generate a line-of-sight guidance image 5 by resizing an image of the user's eyes and their surroundings so as to fit in the peripheral region 13a-1 as shown in (a) of FIG. 15. The line-of-sight guidance image 5 is displayed in such a manner that the middle part of the line-of-sight guidance image 5 overlaps the notch 13b similarly to the example shown in (a) of FIG. 14. This display of the line-of-sight guidance image 5 in such a manner that the middle part of the line-of-sight guidance image 5 overlaps the notch 13b enables the user to adjust his/her line of sight while looking at his/her eyes in the line-of-sight guidance image 5. The display hence enables the user to more readily adjust his/her line of sight to a reference position.

The display control unit 14a in the example shown in (a) of FIG. 15 may implement controls to display line-of-sight adjusting images A1 in locations corresponding to reference positions in the line-of-sight guidance image 4 as shown in (b) of FIG. 15. The line-of-sight adjusting images A1 appear circular as indicated by broken lines, but may have any shape.

The display control unit 14a implements controls to display, as well as the line-of-sight adjusting images A1, an illustrative image D1 in such a manner that the illustrative image D1 overlaps the head of the user in the second image F. The illustrative image D1 is a display for prompting the user to adjust his/her line of sight to the line-of-sight adjusting images A1 and contains in a rectangular frame a message, "Adjust the positions of your eyes to the guide."

The display of the illustrative image D1 enables the user to more certainly provide a line-of-sight position that is suited to selfie photography. The illustrative image D1 may be varied in its content, position, and other properties in a desirable manner. In addition, the illustrative image D1 may not be displayed even when the line-of-sight adjusting images A1 are displayed.

The line-of-sight guidance images 4 and 5 may be generated in advance and stored in a memory of the display control unit 14a or in the storage device 11. In such cases, the control device 14 performs facial authentication using the image captured by the camera 10 and if the control device 14 determines that the face in the captured image is the user's face, the display control unit 14a implements controls to display the line-of-sight guidance images 4 and 5.

Embodiment 6

A smartphone 600 in accordance with the present embodiment differs from the smartphones 100 to 500 in accordance with Embodiments 1 to 5 in that the smartphone 600 includes two cameras 10 and a display control unit 14a that implements controls to display a line-of-sight guidance image 1 appropriately for one of the cameras 10 that is going to be used in selfie photography (image capturing by the image capturing device). Referring to FIG. 16, the peripheral region 13a-1 of the display screen 13a has formed two notches 13b each containing a camera 10 therein.

In response to a user command input for selfie photography, the display control unit 14a acquires a result of selection of one of the two cameras 10 from the user input device 12. Next, the display control unit 14a implements controls to display the line-of-sight guidance image 1 around the arrangement position of one of the cameras 10 that is going to be used in selfie photography in accordance with the result of the selection.

In the example shown in FIG. 16, because the camera 10 on the right-hand side as viewed in the drawing is going to be used in selfie photography, the display control unit 14a implements controls to display the line-of-sight guidance image 1 around the arrangement position of that one of the cameras 10. This method of displaying the line-of-sight guidance image 1 around the arrangement position of one of the cameras 10 that is going to be used in selfie photography is similarly applicable when the smartphone 600 includes three or more cameras 10.

Embodiment 7

A smartphone 700 in accordance with the present embodiment differs from the smartphones 100 to 600 in accordance with Embodiments 1 to 6 in that the display control unit 14a of the smartphone 700, in taking moving images of the user by selfie photography, implements controls to display the line-of-sight guidance image 1 in a dynamic manner in accordance with the user's changing line of sight.

The control device 14 of the smartphone 700 includes the first calculation unit 14b in addition to the display control unit 14a as shown in (a) of FIG. 1. The line-of-sight position V of the user is constantly calculated in the second calculation process performed by the first calculation unit 14b. The display control unit 14a implements controls to display the line-of-sight guidance image 1 in a region between the line-of-sight position V and the arrangement position of the camera 10 for each constantly calculated line-of-sight position V, in order to implement controls to dynamically display the line-of-sight guidance image 1.

As an example, if the line-of-sight position V is in the upper left of the second image F as viewed in the drawing (and near the head of the user in the image) at a certain point in time, the display control unit 14a implements controls to display three partial line-of-sight guidance images 1a in such a manner that these partial line-of-sight guidance images 1a line up from the line-of-sight position V toward the upper right as viewed in the drawing, as shown in (a) of FIG. 17. As another example, if the line-of-sight position V is in the upper right of the second image F as viewed in the drawing (and near the edge of the display screen 13a) at a certain point in time, the display control unit 14a implements controls to display two partial line-of-sight guidance images 1a in such a manner that these partial line-of-sight guidance images 1a line up from the line-of-sight position V toward the left as viewed in the drawing, as shown in (b) of FIG. 17.

This dynamic display of the line-of-sight guidance image 1 enables the user to keep his/her line of sight to a reference position that is suited to selfie photography even when taking his/her moving images by selfie photography. These dynamically displayed line-of-sight guidance images 1 may not be displayed if the line-of-sight position V is in a reference region or if the line-of-sight position V is no longer detected.

Software Implementation

The control blocks of the control device 14 (particularly, the display control unit 14a) may be implemented by logic circuits (hardware) fabricated, for example, in the form of an integrated circuit (IC chip) and may be implemented by software.

In the latter form of implementation, the control device 14 includes a computer that executes instructions from programs or software by which various functions are implemented. This computer includes among others at least one processor (control device) and at least one computer-readable storage medium containing the programs. The processor in the computer then retrieves and runs the programs contained in the storage medium, thereby achieving the object of the present invention. The processor may be, for example, a CPU (central processing unit). The storage medium may be a "non-transitory, tangible medium" such as a ROM (read-only memory), a tape, a disc/disk, a card, a semiconductor memory, or programmable logic circuitry. The storage medium may further include, for example, a RAM (random access memory) for loading the programs. The programs may be supplied to the computer via any transmission medium (e.g., over a communications network or by broadcasting waves) that can transmit the programs. The present invention, in an aspect thereof, encompasses data signals on a carrier wave that are generated during electronic transmission of the programs.

General Description

The present invention, in aspect 1 thereof, is directed to an electronic device (smartphones 100 to 700) including: at least one image capturing device (camera 10); at least one display device (13); and at least one control device (14), wherein the at least one image capturing device is disposed in a peripheral region (13a-1) of a display screen (13a) of the display device, and the control device performs a display process of displaying a line-of-sight guidance image (1, 2, 3, 4, 5) on the display screen around an arrangement position of the at least one image capturing device, to guide a line of sight of a human imaging subject to a reference region (S) of the display screen, the reference region being suited to selfie photography.

In this configuration, the control device implements controls to display a line-of-sight guidance image in or near a peripheral region of the display screen, thereby reducing or eliminating the overlapping of the line-of-sight guidance image and a second image of the human imaging subject on the display screen. The configuration therefore enables the human imaging subject to simultaneously and easily recognize his/her face and a line-of-sight guidance image on the display screen.

In aspect 2 of the present invention (smartphone 100), the electronic device of aspect 1 may be configured such that the control device, in response to an input of an image capturing command, performs the display process so as to display the line-of-sight guidance image (3) in a prescribed location and subsequently display the line-of-sight guidance image in such a manner that the line-of-sight guidance image appears approaching the arrangement position at each prescribed timing.

In this configuration, the human imaging subject can see the motion of the line-of-sight guidance image and direct his/her line of sight to the reference region at a prescribed timing. The configuration therefore enables the human imaging subject to simultaneously and easily recognize his/her face and the line-of-sight guidance image on the display screen. The configuration also more certainly enables the human imaging subject looking from the front to take a photo using the image capturing device.

In aspect 3 of the present invention (smartphone 200), the electronic device of either aspect 1 or 2 may be configured such that the control device performs: a first calculation process of analyzing first images (E) of eyes of the human imaging subject to calculate center-of-gravity locations (G) of pupils of the human imaging subject with reference to centers of the eyes; and a first decision-making process of comparing the center-of-gravity locations with threshold values (Lth, Rth) to determine whether or not the line of sight is being directed at the at least one image capturing device, wherein the control device, upon determining in the first decision-making process that the line of sight is being directed at the at least one image capturing device, performs the display process so as to display auxiliary line-of-sight guidance images (A) in the reference region to guide the line of sight to the reference region.

According to this configuration, the line of sight of the human imaging subject can be guided back to the reference region even if the line of sight is being directed at the image capturing device in selfie photography. The configuration therefore enables the human imaging subject to simultaneously and easily recognize his/her face and the line-of-sight guidance image on the display screen. The configuration also more certainly enables the human imaging subject looking from the front to take a photo using the image capturing device.

In aspect 4 of the present invention, the electronic device of any one of aspects 1 to 3 may be configured such that the control device performs: a second calculation process of analyzing first images of eyes of the human imaging subject to calculate, as a line-of-sight position (V), a location on the display screen corresponding to the line of sight; and a second decision-making process of determining, in accordance with whether or not the line-of-sight position is in the reference region, whether or not the line of sight is being directed at the reference region, wherein the control device, upon determining in the second decision-making process that the line of sight is being directed at the reference region, performs the display process so as not to display the line-of-sight guidance image (2).

In this configuration, the control device implements controls not to display the line-of-sight guidance image upon determining that the line of sight of the human imaging subject is being directed at the reference region. The configuration therefore enables the human imaging subject looking from the front to take a selfie photo without paying attention to the displayed line-of-sight guidance image. The configuration can also prevent the line-of-sight guidance image from being purposelessly continuously displayed despite that the line of sight of the human imaging subject is already being directed to a location that is suited to image capturing by the image capturing device, thereby contributing reduction in power consumption of the electronic device.

In aspect 5 of the present invention, the electronic device of any one of aspects 1 to 4 may be configured such that the control device performs a second calculation process of analyzing first images of eyes of the human imaging subject to calculate, as a line-of-sight position, a location on the display screen corresponding to the line of sight, wherein the control device performs the display process so as to display the line-of-sight guidance image in a region between the line-of-sight position and the arrangement position.

In this configuration, the control device implements controls to display the line-of-sight guidance image in a region between the line-of-sight position and the arrangement position of the image capturing device. The configuration therefore enables the line-of-sight guidance image to be displayed in such a manner as to unfailingly guide the line of sight of the human imaging subject to the reference region in accordance with the actual line of sight. The configuration hence enables the human imaging subject to simultaneously and easily recognize his/her face and the line-of-sight guidance image on the display screen and also more certainly enables the human imaging subject looking from the front to take a photo using the image capturing device.

In aspect 6 of the present invention (smartphone 300), the electronic device of any one of aspects 1 to 5 may be configured such that the control device performs a third calculation process of analyzing a second image (F) of a face of the human imaging subject, to calculate, as a face-center position (C), a location on the display screen corresponding to a center of the face of the human imaging subject, wherein the control device performs the display process so as to change a display position of the line-of-sight guidance image (3) in accordance with a location arrangement of the face-center position with reference to a center of the display screen.

This configuration enables the line-of-sight guidance image to be displayed in a right-hand side of the peripheral region as viewed in the drawing if, for example, the face of the human imaging subject displayed on the display screen is displaced toward the right as viewed in the drawing from the location arrangement of the face-center position with reference to the center of the display screen. The configuration hence enables the human imaging subject to simultaneously and easily recognize the second image and the line-of-sight guidance image and enables the human imaging subject to take a photo using the image capturing device in accordance with the location of the second image on the display screen.

In aspect 7 of the present invention (smartphone 600), the electronic device of any one of aspects 1 to 6 may be configured such that the at least one image capturing device including a plurality of image capturing devices, wherein the control device, in response to an input of an image capturing command, performs the display process so as to display the line-of-sight guidance image (1) around an arrangement position of one of the plurality of image capturing devices that is used in selfie photography.

This configuration enables the human imaging subject to direct his/her line of sight to one of the plurality of image capturing devices that is actually used in image capturing. When the electronic device includes a plurality of image capturing devices, the configuration therefore more certainly enables the human imaging subject looking from the front to take a photo using one of the plurality of image capturing devices.

In aspect 8 of the present invention (smartphones 100 to 700), the electronic device of any one of aspects 1 to 7 may be configured such that the at least one image capturing device is disposed in a notch (13*b*) formed in the peripheral region.

In this configuration, the image capturing device is disposed closer to an edge of the display screen. Therefore, the line-of-sight guidance image is also displayed closer to the edge of the display screen. The configuration therefore further reduces or more certainly eliminates the overlapping of the line-of-sight guidance image and the second image of the human imaging subject displayed on the display screen.

The configuration hence enables the human imaging subject to simultaneously and more easily recognize his/her face and the line-of-sight guidance image on the display screen.

In aspect 9 of the present invention (smartphone 300), the electronic device of any one of aspects 1 to 8 may be configured such that the control device performs the display process so as to change a display position of the line-of-sight guidance image in accordance with a tilt condition of the electronic device.

This configuration enables the line-of-sight guidance image to be displayed in such a manner as to unfailingly guide the line of sight of the human imaging subject to the reference region in accordance with the tilt condition of the electronic device. The configuration hence enables the human imaging subject to simultaneously and easily recognize his/her face and the line-of-sight guidance image on the display screen and also more certainly enables the human imaging subject looking from the front to take a photo using the image capturing device.

In aspect 10 of the present invention (smartphone 100), the electronic device of aspect 1 may be configured such that the line-of-sight guidance image (2) including a plurality of partial line-of-sight guidance images (2*a*), wherein the control device, in response to an input of an image capturing command, performs the display process so as to display the partial line-of-sight guidance images like concentric circles around the arrangement position and subsequently sequentially turn off the display of the partial line-of-sight guidance images at each prescribed timing starting from one of the partial line-of-sight guidance images located farthest from the arrangement position.

This configuration enables the line-of-sight guidance image or the partial line-of-sight guidance images to be displayed in a shape that looks better on the display screen than, for example, arrow head shapes. The configuration also increases the total area of the partial line-of-sight guidance images over that of the arrow-head shaped partial line-of-sight guidance images and allows changes in the display of the partial line-of-sight guidance images, thereby prompting the human imaging subject to pay attention to the periphery of the image capturing device. The configuration therefore enables the human imaging subject to simultaneously and easily recognize his/her face and the line-of-sight guidance image on the display screen and also more certainly enables the human imaging subject looking from the front to take a photo using the image capturing device.

The present invention, in aspect 11 thereof, is directed to a control device (14) that controls an electronic device (smartphones 100 to 700) including at least one image capturing device (camera 10) and at least one display device (13), the at least one image capturing device being disposed in a peripheral region (13*a*-1) of a display screen (13*a*) of the display device, the control device including a display control unit (14*a*) configured to display a line-of-sight guidance image (1, 2, 3, 4, 5) on the display screen around an arrangement position of the at least one image capturing device, to guide a line of sight of a human imaging subject to a reference region (S) of the display screen, the reference region being suited to selfie photography. This configuration provides a control device that enables the human imaging subject to simultaneously and easily recognize his/her face and the line-of-sight guidance image on the display screen.

The present invention, in aspect 12 thereof, is directed to a method of controlling an electronic device (smartphones 100 to 700) including at least one image capturing device (camera 10) and at least one display device (13), the at least one image capturing device being disposed in a peripheral region (13*a*-1) of a display screen of the display device (13*a*), the method including the display step (S103, S203) of displaying a line-of-sight guidance image (1, 2, 3, 4, 5) on the display screen around an arrangement position of the at least one image capturing device, to guide a line of sight of a human imaging subject to a reference region (S) of the display screen, the reference region being suited to selfie photography. This configuration provides a control method that enables the human imaging subject to simultaneously and easily recognize his/her face and the line-of-sight guidance image on the display screen.

The control device of any aspect of the present invention may be implemented on a computer, in which case the present invention encompasses a program that causes a computer to function as the various units (software elements) of the control device, thereby implementing the control device on the computer, and also encompasses a computer-readable storage medium containing the program.

Additional Remarks

The present invention is not limited to the description of the embodiments above and may be altered within the scope of the claims. Embodiments based on a proper combination of technical means disclosed in different embodiments are encompassed in the technical scope of the present invention. Furthermore, a new technological feature can be created by combining different technological means disclosed in the embodiments.

REFERENCE SIGNS LIST

1 Line-of-sight Guidance Image
10 Camera (Image Capturing Device)
13 Display Device
13*a* Display Screen
13*a*-1 Peripheral Region
13*b* Notch
14 Control Device
14*a* Display Control Unit
100 Smartphone (Electronic Device)
A Auxiliary Line-of-sight Guidance Image
C Face-center Position
E First Image
F Second Image
G Center-of-gravity Location
Lth, Rth Threshold Value
S Reference Region
V Line-of-sight Position

The invention claimed is:

1. An electronic device comprising:
at least one image capturing device;
at least one display device; and
at least one control circuitry, wherein
the at least one image capturing device is disposed in a peripheral region of a display screen of the display device, and
the control circuitry performs a display process of displaying a line-of-sight guidance image on the display screen around an arrangement position of the at least one image capturing device, to guide a line of sight of a human imaging subject to a reference region of the display screen, the reference region being suited to image capturing by the at least one image capturing device,
wherein the control circuitry performs a second calculation process of analyzing first images of eyes of the human imaging subject to calculate, as a line-of-sight position, a location on the display screen corresponding to the line of sight,
wherein the control circuitry performs the display process so as to display the line-of-sight guidance image in a region between the line-of-sight position and the arrangement position.

2. The electronic device according to claim 1, wherein the control circuitry, in response to an input of an image capturing command, performs the display process so as to display the line-of-sight guidance image in a prescribed location and subsequently display the line-of-sight guidance image in such a manner that the line-of-sight guidance image appears approaching the arrangement position at each prescribed timing.

3. The electronic device according to claim 1, wherein the control circuitry performs:
a first calculation process of analyzing first images of eyes of the human imaging subject to calculate center-of-gravity locations of pupils of the human imaging subject with reference to centers of the eyes; and
a first decision-making process of comparing the center-of-gravity locations with threshold values to determine whether or not the line of sight is being directed at the at least one image capturing device,
wherein the control circuitry, upon determining in the first decision-making process that the line of sight is being directed at the at least one image capturing device, performs the display process so as to display auxiliary line-of-sight guidance images in the reference region to guide the line of sight to the reference region.

4. The electronic device according to claim 1, wherein the control circuitry performs:
a second decision-making process of determining, in accordance with whether or not the line-of-sight position is in the reference region, whether or not the line of sight is being directed at the reference region,
wherein the control circuitry, upon determining in the second decision-making process that the line of sight is being directed at the reference region, performs the display process so as not to display the line-of-sight guidance image.

5. The electronic device according to claim 1, wherein the control circuitry performs a third calculation process of analyzing a second image of a face of the human imaging subject, to calculate, as a face-center position, a location on the display screen corresponding to a center of the face of the human imaging subject,
wherein the control circuitry performs the display process so as to change a display position of the line-of-sight guidance image in accordance with a location arrangement of the face-center position with reference to a center of the display screen.

6. The electronic device according to claim 1, the at least one image capturing device comprising a plurality of image capturing devices, wherein the control circuitry, in response to an input of an image capturing command, performs the display process so as to display the line-of-sight guidance image around an arrangement position of one of the plurality of image capturing devices that is used in the image capturing.

7. The electronic device according to claim 1, wherein the control circuitry performs the display process so as to change a display position of the line-of-sight guidance image in accordance with a tilt condition of the electronic device.

8. The electronic device according to claim 1, the line-of-sight guidance image including a plurality of partial line-of-sight guidance images, wherein the control circuitry, in response to an input of an image capturing command, performs the display process so as to display the partial line-of-sight guidance images like concentric circles around the arrangement position and subsequently sequentially turn off the display of the partial line-of-sight guidance images at each prescribed timing starting from one of the partial line-of-sight guidance images located farthest from the arrangement position.

9. The electronic device according to claim 1, wherein the at least one image capturing device is disposed in a notch formed in the peripheral region.

10. The electronic device according to claim 9, wherein the line-of-sight guidance image is displayed on both sides of the notch so as to flank the notch.

11. The electronic device according to claim 10, wherein the line-of-sight guidance image includes a plurality of pairs of partial line-of-sight guidance images, and
the plurality of pairs of partial line-of-sight guidance images are displayed on both sides of the notch so as to flank the notch along a line.

12. A control circuitry that controls an electronic device including at least one image capturing device and at least one display device, the at least one image capturing device being disposed in a peripheral region of a display screen of the display device, the control circuitry comprising a display control unit configured to display a line-of-sight guidance image on the display screen around an arrangement position of the at least one image capturing device, to guide a line of sight of a human imaging subject to a reference region of the display screen, the reference region being suited to image capturing by the at least one image capturing device,
wherein the display control unit is configured to perform a second calculation process of analyzing first images of eyes of the human imaging subject to calculate, as a line-of-sight position, a location on the display screen corresponding to the line of sight, and
wherein the display control unit is configured to display the line-of-sight guidance image in a region between the line-of-sight position and the arrangement position.

13. A method of controlling an electronic device including at least one image capturing device and at least one display device, the at least one image capturing device being disposed in a peripheral region of a display screen of the display device, the method comprising a display step of displaying a line-of-sight guidance image on the display screen around an arrangement position of the at least one image capturing device, to guide a line of sight of a human imaging subject to a reference region of the display screen, the reference region being suited to image capturing by the at least one image capturing device,
wherein a second calculation process of analyzing first images of eyes of the human imaging subject to calculate, as a line-of-sight position, a location on the display screen corresponding to the line of sight is performed,
wherein the display step is performed so as to display the line-of-sight guidance image in a region between the line-of-sight position and the arrangement position.

* * * * *